US011216285B2

(12) United States Patent
Cheng et al.

(10) Patent No.: US 11,216,285 B2
(45) Date of Patent: Jan. 4, 2022

(54) TRANSACTION STATE LOGGER AND RETRIEVER

(71) Applicant: Oracle International Corporation, Redwood Shores, CA (US)

(72) Inventors: Guofu Cheng, Wuhan (CN); Yingmei Liu, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/441,380

(22) Filed: Jun. 14, 2019

(65) Prior Publication Data

US 2020/0394052 A1 Dec. 17, 2020

(51) Int. Cl.
*G06F 16/25* (2019.01)
*G06F 3/0482* (2013.01)
*G06F 9/451* (2018.01)
*G06F 40/174* (2020.01)
*G06F 9/445* (2018.01)
*G06F 16/955* (2019.01)
*G06F 40/186* (2020.01)

(52) U.S. Cl.
CPC ........ *G06F 9/44526* (2013.01); *G06F 3/0482* (2013.01); *G06F 9/451* (2018.02); *G06F 16/252* (2019.01); *G06F 16/9566* (2019.01); *G06F 40/174* (2020.01); *G06F 40/186* (2020.01)

(58) Field of Classification Search
CPC .. G06F 9/44526; G06F 9/451; G06F 16/9566; G06F 16/252; G06F 40/186; G06F 40/174; G06F 3/0482
See application file for complete search history.

(56) References Cited

U.S. PATENT DOCUMENTS

| | | | |
|---|---|---|---|
| 6,345,278 B1 * | 2/2002 | Hitchcock | G06F 40/174 |
| 7,370,053 B2 | 5/2008 | Cabrera et al. | |
| 8,621,575 B2 | 12/2013 | Wiseman et al. | |
| 8,650,085 B2 | 2/2014 | Wilder et al. | |
| 8,688,661 B2 | 4/2014 | Greiner et al. | |
| 8,892,718 B2 | 11/2014 | Le Bach et al. | |
| 8,977,823 B2 | 3/2015 | Alexander et al. | |
| 9,098,960 B1 | 8/2015 | Folk et al. | |
| 9,298,631 B2 | 3/2016 | Alexander et al. | |
| 9,569,255 B1 * | 2/2017 | Johnson | G06Q 30/0643 |
| 10,649,864 B1 * | 5/2020 | Parikh | G06F 11/1471 |

(Continued)

*Primary Examiner* — Andrew T Chiusano
(74) *Attorney, Agent, or Firm* — Tarolli, Sundheim, Covell & Tummino LLP

(57) ABSTRACT

In the described examples a given graphical user interface (GUI) instance of a set of GUI instances for a given transaction with an external system is provided. The given GUI instance of the given transaction comprises a set of data fields for completing the given transaction. The set of data fields exposed in the given GUI instance are dependent on execution of an operation in another GUI instance in the set of GUI instances for the given transaction, wherein the given GUI instance of the transaction receives a given data set for the set of data fields. The given data set characterizes user input for the given GUI instance of the given transaction, and the given data set and the given GUI instance of the given transaction correspond to a given state of the given transaction. A transaction state logger tracks the given transaction.

22 Claims, 18 Drawing Sheets

(56) References Cited

U.S. PATENT DOCUMENTS

| | | | |
|---|---|---|---|
| 2005/0216356 A1* | 9/2005 | Pearce | G06F 40/174 715/207 |
| 2008/0040484 A1* | 2/2008 | Yardley | H04L 67/142 709/227 |
| 2008/0184102 A1* | 7/2008 | Selig | G06F 40/174 715/234 |
| 2009/0006646 A1* | 1/2009 | Duarte | G06F 40/174 709/236 |
| 2009/0113285 A1* | 4/2009 | Ishii | G06F 40/174 715/221 |
| 2010/0017695 A1* | 1/2010 | Palmieri | G06F 16/95 715/205 |
| 2010/0241518 A1* | 9/2010 | McCann | G06Q 30/0603 705/17 |
| 2010/0306343 A1 | 12/2010 | Arunachalam | |
| 2011/0093779 A1* | 4/2011 | Gador | G06F 9/453 715/705 |
| 2012/0166518 A1* | 6/2012 | Alev | H04L 67/02 709/203 |
| 2015/0095847 A1* | 4/2015 | Kleinhout | G06F 3/0484 715/784 |
| 2015/0205463 A1* | 7/2015 | Filev | G06Q 10/10 715/746 |
| 2017/0277773 A1* | 9/2017 | Iasi | G06F 16/9535 |
| 2018/0095705 A1* | 4/2018 | Roberts | G06F 3/1292 |

\* cited by examiner

FIG. 5

FIG. 15

TRANSACTION STATE LOGGER AND RETRIEVER

TECHNICAL FIELD

The present disclosure relates to transaction processing.

BACKGROUND

Transaction processing is information processing in computer science that is divided into individual, indivisible stages (e.g., operations) called transactions. Each transaction must succeed or fail as a complete unit. For example, when purchasing a book from an online bookstore, money (in the form of credit) is exchanged for a book. If the credit is good, a series of related stages ensures that selected book is provided to an orderer and that the online bookstore receives the money. However, if a single stage in the series fails during the exchange, the entire exchange fails. That is, in the example, the book is not provided to the orderer and the online bookstore does not receive the money. The technology responsible for making the exchange balanced and predictable is called transaction processing. Transactions ensure that data-oriented resources are not permanently updated unless all stages within the transactional unit complete successfully. By combining a set of related stages into a unit that either completely succeeds or completely fails, error recovery is simplified and the application is more reliable.

Transaction processing systems include computer hardware and software hosting a transaction-oriented application that performs the routine transactions necessary to conduct business. Examples include systems that manage sales order entry, airline reservations, payroll, employee records, manufacturing and shipping. Since most, though not necessarily all, transaction processing today is interactive, the term transaction processing is often treated as synonymous with online transaction processing.

Additionally, in standard transaction processing, a user provides user input for each required field. Moreover, transaction processing includes a validation check for data entered in the required fields at a time that the transaction is saved for processing. However, in standard transaction processing, transactions are not saved until each required field is entered and each input entered by the user passes the validation check.

SUMMARY

One example relates to a method that includes causing display of a given graphical user interface (GUI) instance of a set of GUI instances for a given transaction with an external system, the given GUI instance of the given transaction comprises a set of data fields for completing the given transaction, wherein the set of data fields exposed in the given GUI instance are dependent on execution of an operation in another GUI instance in the set of GUI instances for the given transaction, wherein the given GUI instance of the transaction receives a given data set for the set of data fields. The given data set characterizes user input for the given GUI instance of the given transaction, and the given data set and the given GUI instance of the given transaction correspond to a given state of the given transaction. The method can also include tracking, by a transaction state logger, the given transaction in response to actuation of a given selectable element during the given GUI instance of the given transaction, wherein the transaction state logger generates or updates an entry for a pending transaction log that stores a resource address of the given GUI instance of the given transaction and the given data set for the set of data fields. The method can further include retrieving, by a transaction state retriever, at least a portion of the pending transaction log in response to actuation of another selectable element, the transaction state retriever causes display of a list of entries in the pending transaction log. Selection of an particular entry in the list of entries in the pending transaction log causes the transaction state retriever to interact with a web server to simulate execution of an operation for the selected pending transaction to load a selected pending transaction in a state corresponded to the data in the selected entry of the pending transaction log.

Another example relates to a method for logging a state of a transaction, the method includes receiving, by the computing platform, a given data set for the set of data fields, wherein the given data set characterizes user input for a given graphical user interface (GUI) instance of a set of GUI instances for the transaction, wherein the set of data fields exposed in the given GUI instance are dependent on execution of an operation in another GUI instance in the set of GUI instances for the given transaction and the given data set and the given GUI instance of the transaction correspond to a given state of the transaction. The method also includes generating or updating, by the computing platform, in response to actuation of a given selectable element, an entry for a pending transaction log entry that characterizes a resource address of the given GUI instance of the transaction and data characterizing the given data set for the set of data fields. Selection of the entry of the pending transaction log causes the computing platform to load the given state of the transaction. The loading includes accessing the resource address stored in the entry of the pending transaction log to interact with a web server to simulate execution of an operation for the transaction to provide the given GUI instance of the transaction and populating the given GUI instance of the transaction with the set of data fields stored in the entry of the pending transaction log.

Yet another example relates to a non-transitory computer-readable storage medium storing program instructions that when executed by a computing platform operating on a device cause the computing platform to perform operations. The operations include receiving, by a computing platform, a given data set for a set of data fields, wherein the given data set characterizes user input for a given graphical user interface (GUI) instance in a set of GUI instances for the transaction, wherein the set of data fields exposed in the given GUI instance are dependent on execution of an operation in another GUI instance in the set of GUI instances for the given transaction, and the set of data fields and the given GUI instance of the transaction correspond to a given state of the transaction. The operations also include generating or updating, by the computing platform, in response to actuation of a given selectable element, an entry for a pending transaction log entry that characterizes a resource address of the given GUI instance of the transaction and data characterizing the given data set for the set of data fields. Selection of the entry of the pending transaction log causes the computing platform to load the given state of the transaction. The loading includes accessing the resource address stored in the entry of the pending transaction log to interact with a web server to simulate execution of an operation for the transaction to provide the given GUI instance of the transaction and populating the GUI instance of the transaction with the set of data fields stored in the entry of the pending transaction log.

BRIEF DESCRIPTION OF THE DRAWINGS

FIG. 5 illustrates a screenshot of a third stage of a define item transaction.

FIG. 15 illustrates an example of a web browser with web pages loaded in response to actuation of a selected transaction.

DETAILED DESCRIPTION

Figure 1:
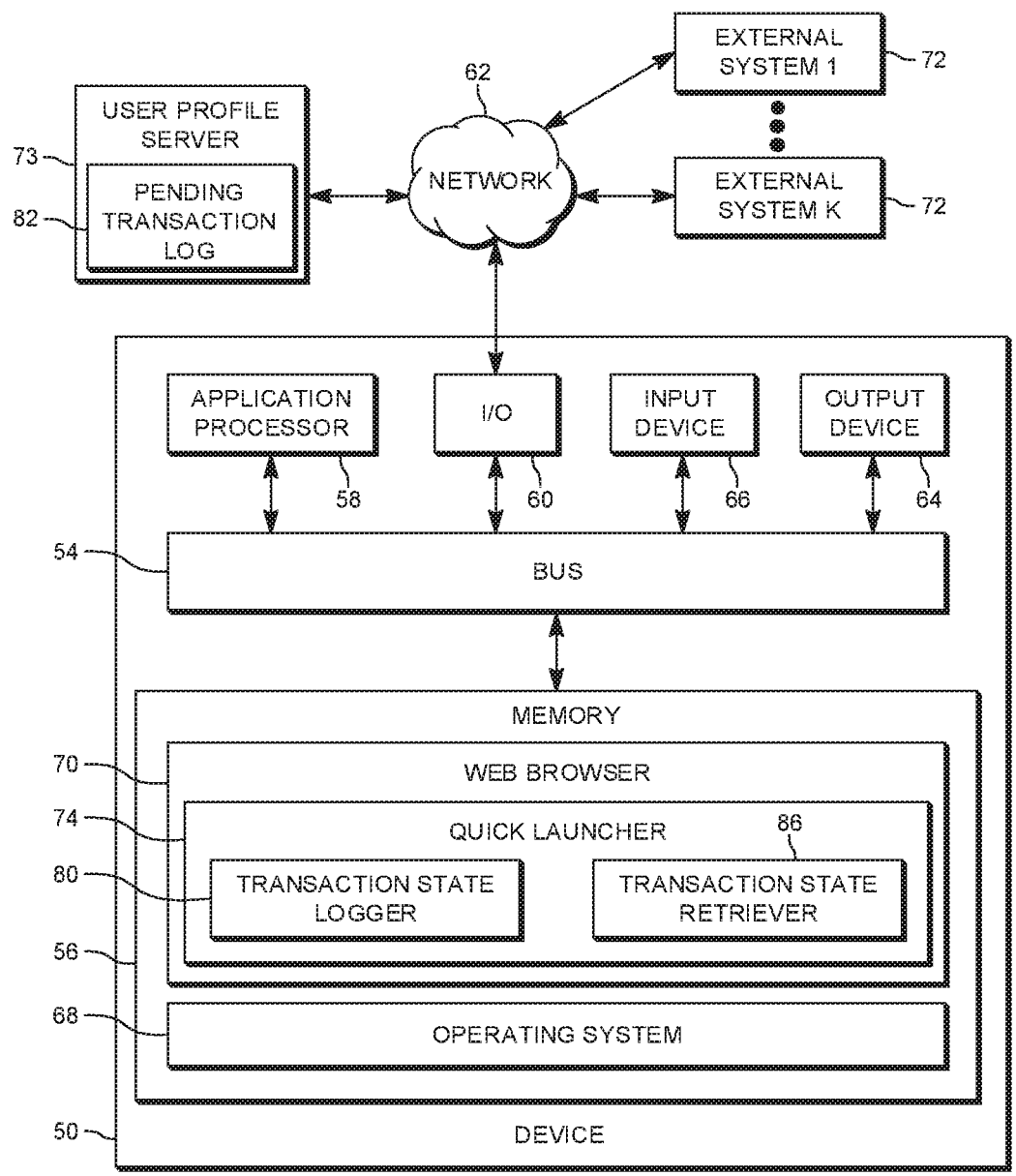
FIG. 1 illustrates a block diagram of a device employable to store and retrieve transactions at particular states.

The present disclosure relates to systems and methods for logging a state of a transaction in a pending transaction log and subsequently loading the state of the transaction from the pending transaction log. A transaction has a sequence of stages that can be represented as different web pages. As used herein, the term "state of a transaction" defines a combination of a stage of the transaction along with data for data fields in the stage of the transaction. For example, a final stage of a retail transaction could be a web page for entering payment information. In such a situation, the final stage of the transaction along with data populating a credit card data field in the final stage of the transaction could define the state of the transaction.

More generally, the described system (e.g., a computing platform) includes a web browser that causes display of a user interface having a set of data fields for completing a given stage of a transaction with an external system (e.g., operating on a web server). The user interface receives a given data set for the set of data fields, and the given data set characterizes user input for a given stage of the transaction. The given data set and the given stage of the transaction correspond to a given state of the transaction.

The system includes a transaction state logger that causes display of a given selectable element for the user interface, wherein actuation of the given selectable element causes the transaction state logger to generate or update an entry for a pending transaction log that stores a resource address of the given stage of the transaction and the given data set for the set of data fields. The system also includes a transaction state retriever that is retrieves at least a portion of the pending transaction log in response to actuation of another selectable element. The transaction state retriever causes display of a list of entries in the pending transaction log, and wherein selection of an entry in the list of entries in the pending transaction log causes the transaction state retriever to load a corresponding pending transaction at a state characterized in the selected entry of the pending transaction log. To load the transaction state, the transaction state retriever accesses the resource address of the pending transaction of the selected entry of the pending transaction log to provide a stage of the transaction and populates the stage of the transaction corresponding to the selected entry of the pending transaction log with a set of data fields stored in the selected entry of the pending transaction log.

By employment of the systems and methods described herein, it is not necessary to complete every step of a transaction in one session. Rather, a user can get to a particular state of the transaction and employ the transaction state logger to store data for the state of the transaction as an entry in the pending transition log. At a later time, the user can employ the transaction state retriever to restore the state of the transaction, such that the transaction can be completed over multiple sessions.

Furthermore, in some situations, such as inventory management, the same type of transaction is executed multiple times during a work session. The systems and methods described herein allow the user to restore a selected transaction at a particular state, complete the selected transaction and then subsequently restore the same state of the selected transaction at the particular (same) state at a later time. In this manner the same types of transactions can be repeated multiple times without re-execution of every stage in the particular transaction. In particular, the user can employ an application that implements a combination of the transaction state logger and the transaction state retriever (referred to a "quick launcher"). The quick launcher facilitates the creation of a new transaction, and causes display of an interface for changing fields, thereby obviating the need for the user to enter duplicated data each time the transaction is executed. In this manner, the quick launcher causes display of an interface for designing and editing a template for transactions.

FIG. 1 illustrates a block diagram of a device 50 (e.g., a hardware device) employable to store and retrieve transactions at particular states. The device 50 can deploy a computing platform. Moreover, the device 50 can include a bus 54 and/or other communication mechanisms that can communicate information between components of the device 50. The device 50 can also include a memory 56 for storing machine readable instructions and data. The memory 56 can include any one or combination of random access memory ("RAM"), read only memory ("ROM"), static storage such as flash memory, a magnetic or optical disk, or any other type of non-transitory machine or computer-readable medium. This list and any other list is intended to disclose both disjunctive and conjunctive embodiments. The device 50 also includes an application processor 58, operatively coupled to the bus 54, that can process information and execute machine readable instructions or operations.

The application processor 58 may be any type of general or specific purpose processor, such as one or more processor cores. The device 50 further includes an input/output (I/O) port 60, such as a wireless or wired network interface card or other communications interface, to provide access to a network. As some examples, the I/O port 60 can represent any one or more of a Wi-Fi port, a Bluetooth port, a Near Field Communication (NFC) port, a Universal Serial Bus (USB) port, an Ethernet port, a modem, a proprietary communication port and/or any combination thereof. Inclusion of the I/O port 60 allows an external system to interface the device 50 directly or remotely through a network 62 or any other method. The network 62 can be implemented, for example, as a public network (e.g., the Internet), a private network (e.g., a local area network) or a combination thereof (e.g., a virtual private network).

A computer-readable medium may be any available medium that can be accessed by the application processor 58. The computer-readable medium may include both a volatile and nonvolatile medium, a removable and non-removable medium, a communication medium and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

The application processor 58 can also be operatively coupled via the bus 54 to an output device 64 and/or an input device 66. In some examples, the output device 64 can be representative of peripherals of a standard computing device, such as a Liquid Crystal Display ("LCD"). In such situations, the input device 66 can be representative of peripherals such as a keyboard and/or a cursor control device (e.g., a mouse or trackpad) can also be operatively coupled to the bus 54 to enable the user to interface with the device 50. Additionally, the combination of the output device 64 and the input device 66 can be representative of a hardware device such as a touch screen.

In some examples, the memory 56 can store software modules that may provide functionality when executed by the application processor 58. The modules can include an operating system (OS) 68. The OS 68 can provide an operating system functionality for the device 50 to provide a web browser 70.

The web browser 70 can be implemented as a standard web browser that can communicate with K number of external systems 72 (e.g., web servers) via the network 62, where K is an integer greater than or equal to one. Additionally, the web browser 70 can communicate with a user profile server 73 that can store user-specific information for communicating with the external systems 72. Such user-specific information can be implemented as one or more of usernames, passwords, cookies or any combination thereof. Moreover, although the examples described herein reference the web browser 70, any user interface for the K number of external systems 72 is employable.

Each of the K number of external systems 72 and the user profile server 73 can be implemented as computing platforms. Further, each of the K number of external systems 72 (or some subset thereof) and/or the user profile server 73 can be implemented on a computing cloud. In such a situation, features of each of the K number of external systems 72 (or the subset thereof) and/or the user profile server 73, such as a processing unit, a network interface and memory could be representative of a single instance of hardware or multiple instances of hardware with applications executing across the multiple of instances (i.e., distributed) of hardware (e.g., computers, routers, memory, processors, or a combination thereof). Alternatively, each of the K number of external system 72 (or the subset thereof) and/or the user profile server 73 could be implemented on a single dedicated server.

In the examples described, it is presumed that each of the K number of external systems 72 include a transaction processing system that allows a user of the device 50 to execute a transaction with a respective one of the K number of external systems 72. In one example, a one or more of the K number of external systems 72 is implemented as a database management system, such as PEOPLESOFT by Oracle Corporation. For instance, such an external system 72 can be implemented as a database management system. In such a situation, the database management system can be implemented as human resource management system (HRMS), a Financial Management Solution (FMS), a supply chain management (SCM) system, a customer relationship management (CRM) system, an enterprise performance management (EPM) system or any combination thereof. Additionally, one or more of the K number of external systems 72 can be implemented as an online retailer or an online service provider.

The web browser 70 can be employed to execute a transaction on one or more of the K number of external systems 72. Each transaction can be represented as a series of one or more stages, and wherein execution of a final stage represents completion of a transaction. Moreover, execution of each stage prior to the final stage does not complete the transaction. Rather, execution of one or more stages of the transaction, other than the final stage corresponds to a pending transaction. Unless otherwise noted, a pending transaction does not transform into a completed transaction without user intervention.

During each stage of a given transaction, user input characterizing a data set populates data fields for the given transaction. The data fields can be representative of selected graphical menu items, text boxes for alphanumeric text or any combination thereof. As an example, during one stage of the given transaction, text characterizing an address of a recipient of materials can be provided as a data set for data fields in a web page for the given transaction. During many transactions, a user may be distracted by a plethora of different stimuli. In such a situation, the user may not complete a transaction in one session. For instance, in the above example, during a given stage of the given transaction, the user may need to find the address of the recipient by loading a separate web page. In such a situation, the original web page with the given stage of the given transaction may be lost, and the user may be forced to repeat one or more stages of the given transaction to return to the given stage of the given transaction.

To address this problem, the memory 56 includes a quick launcher 74 that is illustrated as being installed as a plugin (e.g., an add-on) of the web browser 70. Alternatively, the quick launcher 74 could be a stand-alone program. The quick launcher 74 is configured to capture a stage of a pending transaction and an associated data set for subsequent restoration (a state of the pending transaction). More particularly, the quick launcher 74 includes a transaction state logger 80 that causes display of a selectable element (e.g., an icon in a user interface) that upon actuation, causes the transaction state logger 80 to generate or update an entry in a pending transaction log (or other log) that stores data sufficient to restore the state of the pending transaction at a later time, which data can be referred to as pending transaction data.

Each stage of a transaction can be represented with an instance of a graphical user interface (GUI) in a set of GUIs instances for a transaction. In some examples, each such instance can be represented as web page. In some examples, the set of GUI instances can be an ordered sequence of GUI instances (e.g., a series of stages) for completing the transaction. However, there is no requirement (implicit or explicit) that the set of GUI instances have a linear relationship. In some examples, the GUI instances in the set of GUI instances (or some subset thereof) can be executed in multiple orders. In other examples, the set of GUI instances are unordered. Moreover, as illustrated herein, multiple different types of transaction can have a common GUI instance. In such a situation, the set of data fields exposed in one or more GUI instances of a particular transaction may be dependent on operations executed in one or more other GUI instances for the particular transaction.

In the example illustrated, the pending transaction log 82 can be stored on the user profile server 73. However, in other examples, the pending transaction log 82 can be stored in the memory 56 of the device 50 (e.g., local to the device 50). The entry in the pending transaction log 82 can include, for example, pending transaction data that is implemented as a resource address for a corresponding stage of the pending transaction and a data set characterizing data entered into a set of data fields for the pending transaction. The resource address can be implemented as a uniform resource locator (URL) address of a web page for the corresponding stage of the pending transaction. In some examples, the entry in the pending transaction log 82 can include data that characterizes user defined text for the pending transaction.

In some examples, the pending transaction log 82 can be associated with a user account, and the pending transaction log 82 is accessible by the user of the device 50. Moreover, in situations where the user profile server 73 stores multiple user profiles, the user profile server 73 can also store a corresponding number of instances of the pending transaction log 82. Alternatively, in some situations, the same pending transaction log 82 is employable for multiple users. In such situations, individual entries of the pending transaction log can be associated with (or assigned to) particular user accounts. Additionally, some or all of the entries in the pending transaction log 82 can be associated multiple stages of transactions. That is, a given entry in the pending transaction log 82 may store data for multiple resource addresses and data fields for different stages of the same type of transaction and/or for different stages of different types of transactions.

The quick launcher 74 can also include a transaction state retriever 86 that can be launched with another selectable element (e.g., an icon or button of a user interface). Upon actuation of the selectable element, the transaction state retriever 86 accesses the pending transaction log 82 and displays a list of the entries in the transaction log or some subset thereof via the output device 64. Upon selection of an entry in the pending transaction log 82, the transaction state retriever 86 loads a corresponding pending transaction at a state characterized in pending transaction data of the selected entry of the pending transaction log 82. As described herein, to load the pending transaction at the stage characterized in the pending transaction data of the selected entry, the transaction state retriever 86 causes the web browser 70 to access the resource address (e.g., the URL) stored in the selected entry to output a web page at the resource address. Additionally, the transaction state retriever 86 populates a set of data fields at the web page of the resource address with a data set stored in the pending transaction data of the selected entry. In this manner, the web browser 70 displays a web page with the transaction at the state (e.g., the same stage with the data fields populated with a corresponding data set) as the state at the time the entry in the pending transaction log 82 was generated or updated. Additionally, as noted, some or all of the entries in the pending transaction log 82 can be associated multiple stages of transactions. In such situations, the transaction retriever 86 causes the web browser 70 to access a plurality of resource addresses (e.g., URLs) stored in the selected entry to output multiple web pages (in different tabs) at the plurality of resource addresses. Additionally, the transaction state retriever 86 populates a set of data fields for each of the multiple web page at the respective resource address with a data set stored in the pending transaction data of the selected entry.

FIGS. 2-12 illustrate examples of screenshot with web pages (e.g., GUI instances) having different types of transactions at different states that could be output by the web browser 70 of FIG. 1. That is, each of the illustrations in FIGS. 2-12 depict a particular transaction at a particular stage with data fields populated to define a particular state.

More particularly, FIGS. 2-5 illustrate an example of web pages depicting a series of stages for a define item transaction. Moreover, for purposes so simplicity of explanation, the same reference numbers are employed in FIGS. 1-5 to denote the same structure. Additionally, some reference numbers are not re-introduced in FIGS. 2-5.

Figure 2:
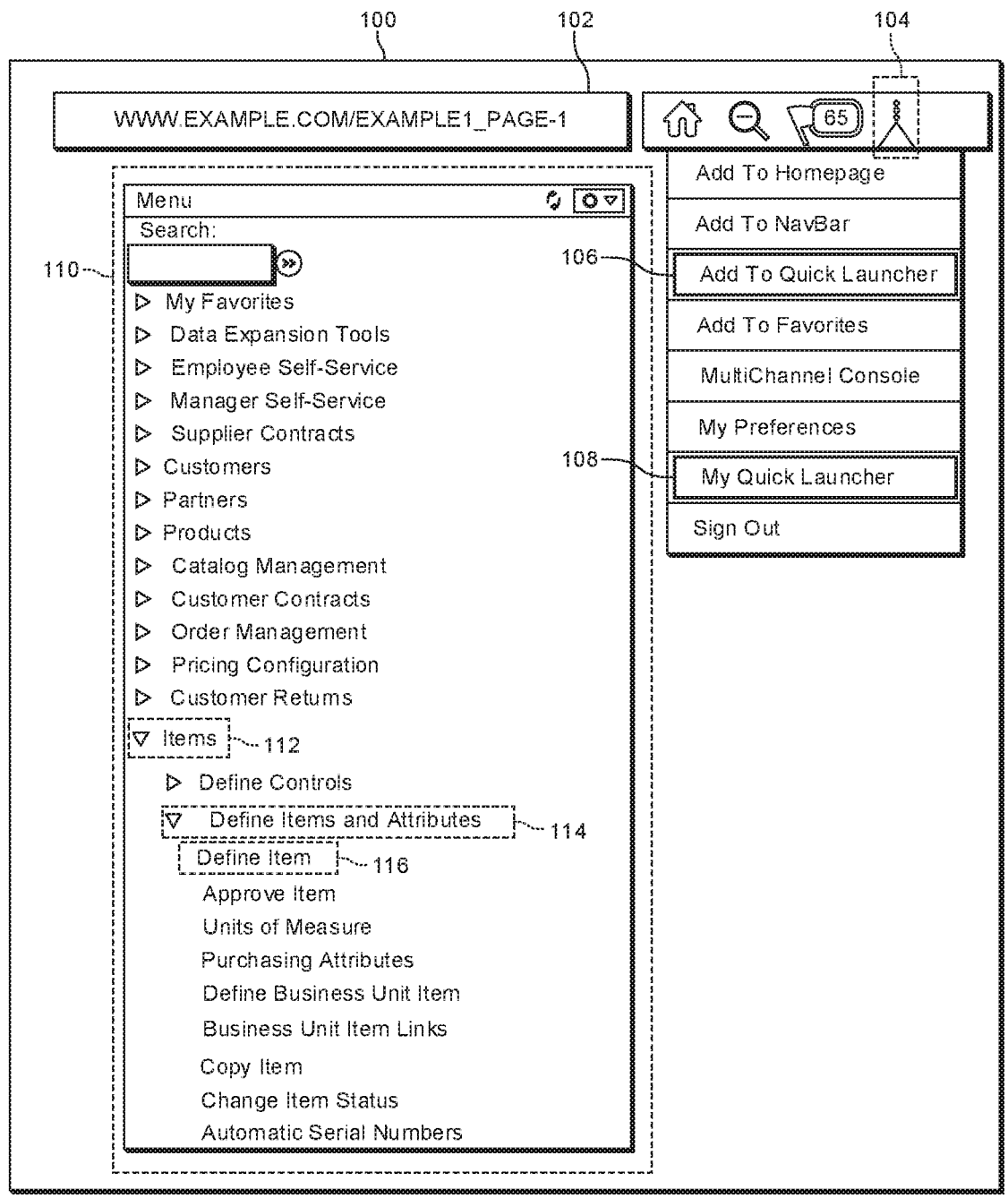
FIG. 2 illustrates a screenshot of a first stage of a define item transaction.

FIG. 2 illustrates an example of a screenshot 100 that includes a web address 102 (e.g., a text box). The web address 102 includes a URL (e.g., a web address) of an external system, such as one of the external system 72 of FIG. 1. In the example illustrated in FIGS. 2-5, it is presumed that the external system is a supply chain management system.

The screenshot 100 includes selectable elements 104 that enable access to the quick launcher 74 of FIG. 1, and other functions, in some examples. The selectable elements 104 includes a first selectable element 106 labeled "Add to Quick Launcher". Actuation of the first selectable element 106 launches the transaction stage logger 80 of FIG. 1. More specifically, actuation of the first selectable element 106 allows a user to add a currently viewed transaction into the transaction stage logger 80 of the quick launcher 74 as described herein in more detail. Additionally, the selectable elements 104 also include a second selectable element 108, labeled "My Quick Launcher". Actuation of the second selectable element 108 launches the transaction state retriever 86 of FIG. 1. More particularly, actuation of the second selectable element 108 causes retrieval of at least a portion of the pending transaction log 82 of FIG. 1 and display of the user access to existing stored transactions (e.g., for execution and/or updating) in the transaction state retriever 86 of the quick launcher 74.

The screenshot 100 includes a web page 110. The web page 110 represents a first stage of a transaction for defining an item. The web page 110 includes a hierarchical list of user selectable text options. In the first stage of the transaction, a first selectable text option 112 labeled "ITEMS" opens a second hierarchical level, and a second selectable text option 114 labeled "DEFINE ITEMS AND ATTRIBUTES" opens a third hierarchical level. Moreover, in the web page 110, the selectable text option 116 labeled "DEFINE ITEM" is selected. Upon selection of the selectable text option 116, the define item transaction advances to a second stage.

Figure 3:
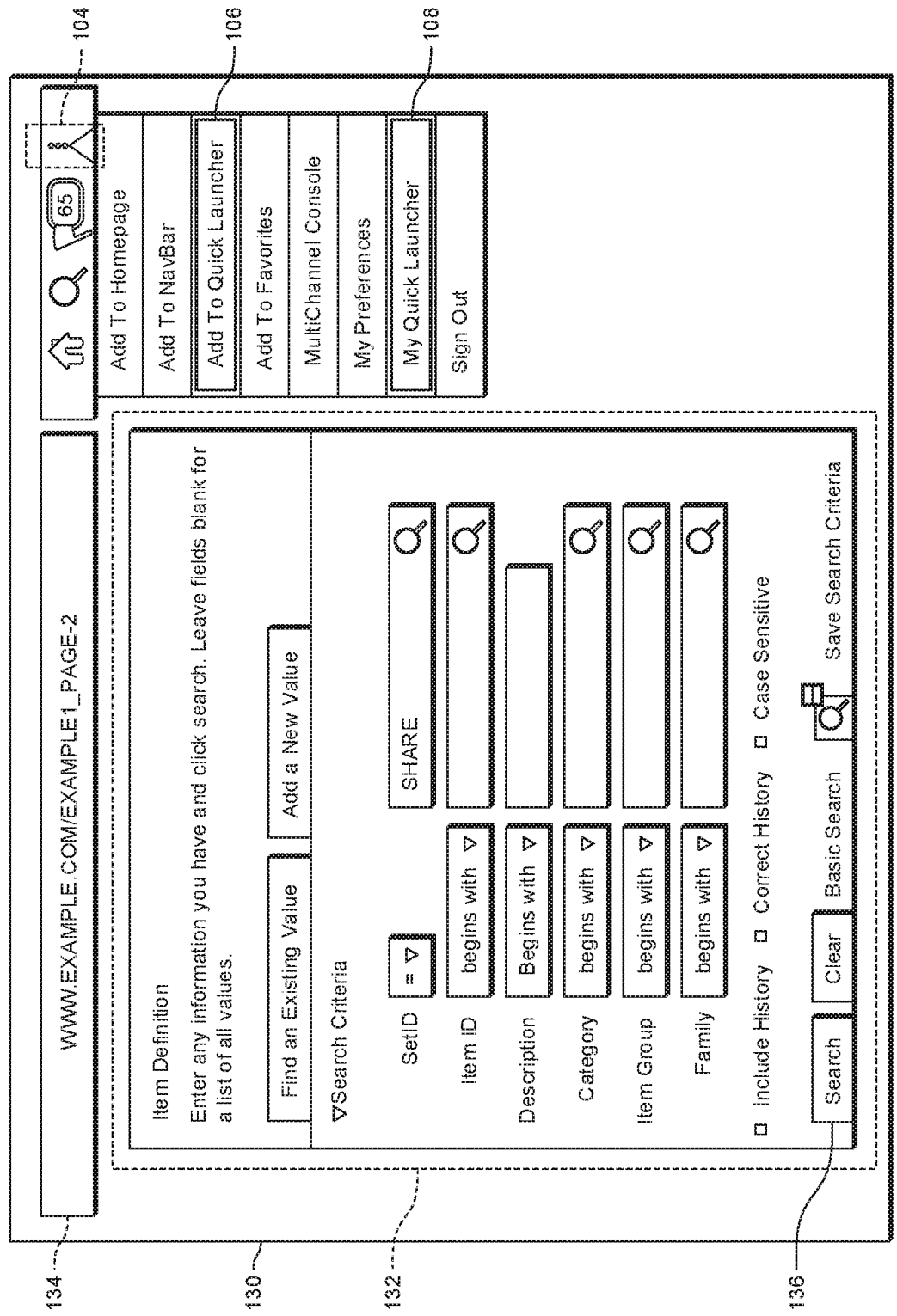
FIG. 3 illustrates a screenshot of a second stage of a define item transaction.

FIG. 3 illustrates a screenshot 130 with a web page 132 depicting a first example the second stage of the define item transaction. The screenshot 130 includes a web address 134 that is different from the web address 102 of FIG. 2. Additionally, the web page 132 includes a set of data fields with text boxes for user input (e.g., alpha numeric text). Additionally, each text box is associated with a pull-down menu. The screenshot 130 still further includes a search button 136. The search button, if actuated, advances the define item transaction to a third stage of the transaction.

Figure 4:
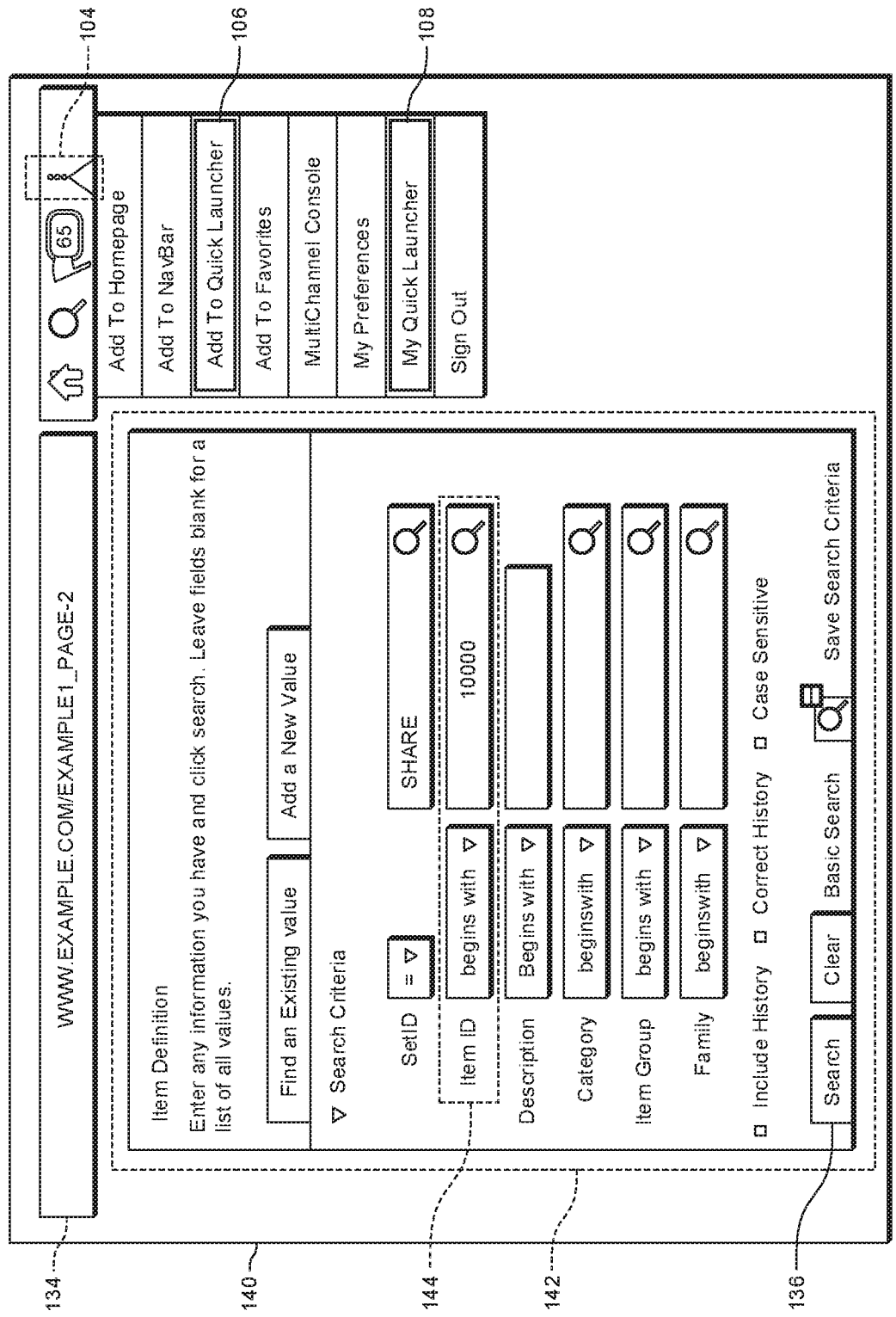
FIG. 4 illustrates another screenshot of a second stage of a define item transaction.

FIG. 4 illustrates a screenshot 140 with a web page 142 depicting a second example of the second stage of the define item transaction. The screenshot 140 includes the web address 134 that is different from the web address 102 of FIG. 2, but the same as the web address 134 of FIG. 3. Additionally, the web page 142 includes a data field 144 (labeled "ITEM ID") that is populated with user input, "10000". Upon actuation of the search button 136 the define item transaction advances to the third stage of the define item transaction. Thus, the screenshot 130 of FIG. 3 and the screenshot 140 of FIG. 4 depict the second stage of the define item transaction in different states.

Figure 5:
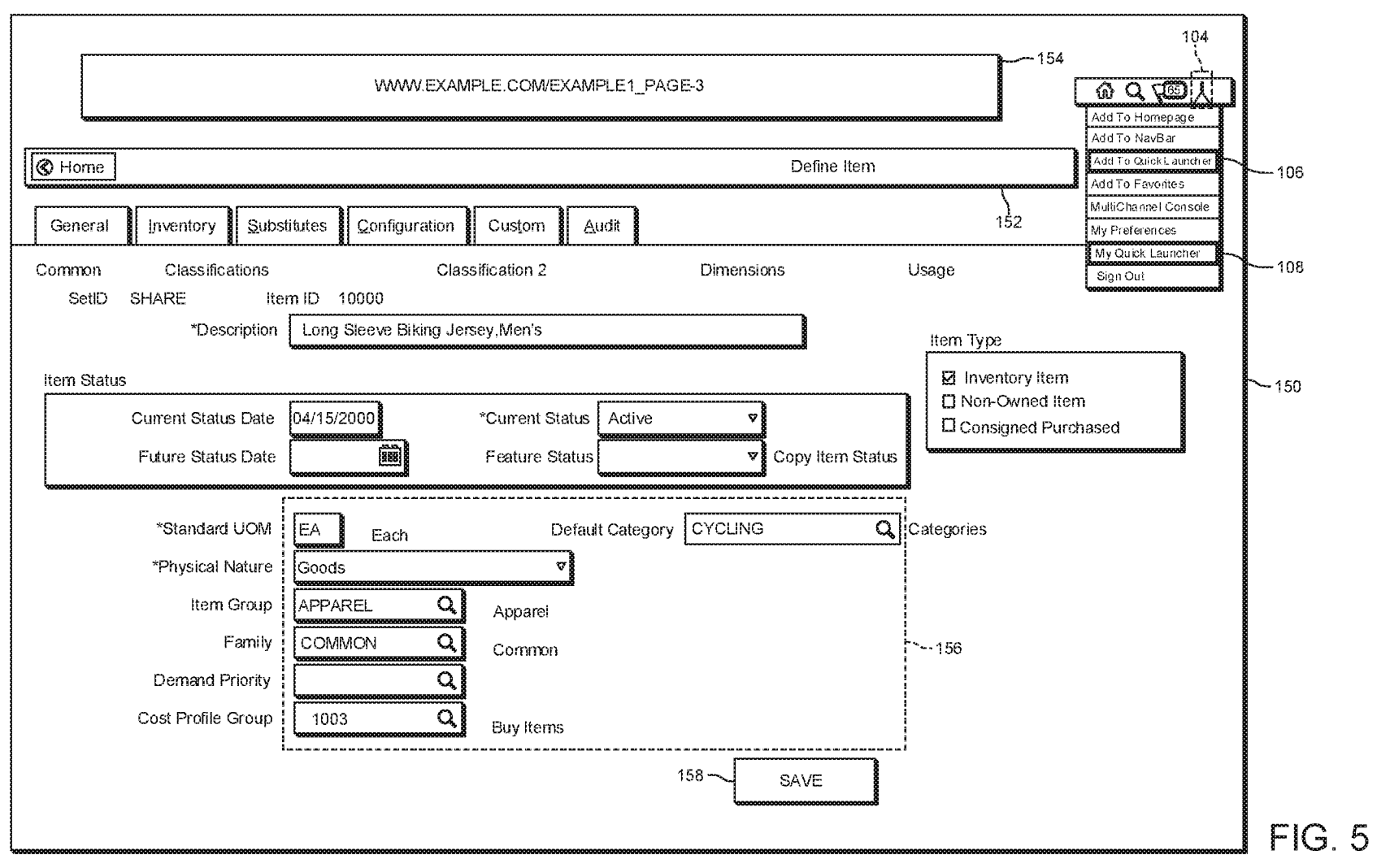

FIG. 5 illustrates a screenshot 150 with a web page 152 depicting the third stage of the define item transaction. The screenshot 150 includes the web address 154 that is different from the web addresses 102 of FIGS. 2 and 134 of FIGS. 3 and 4. Additionally, the web page 152 includes a set of data fields (text boxes) that have been populated with a set of data (user input). In the example illustrated, the data fields "DESCRIPTION", "PHYSICAL NAME", "ITEM GROUP", "FAMILY" and "COST PROFILE GROUP" are populated with alphanumeric next, as indicated by the box 156. Actuation of a save button 158 completes the define item transaction.

Figure 6:
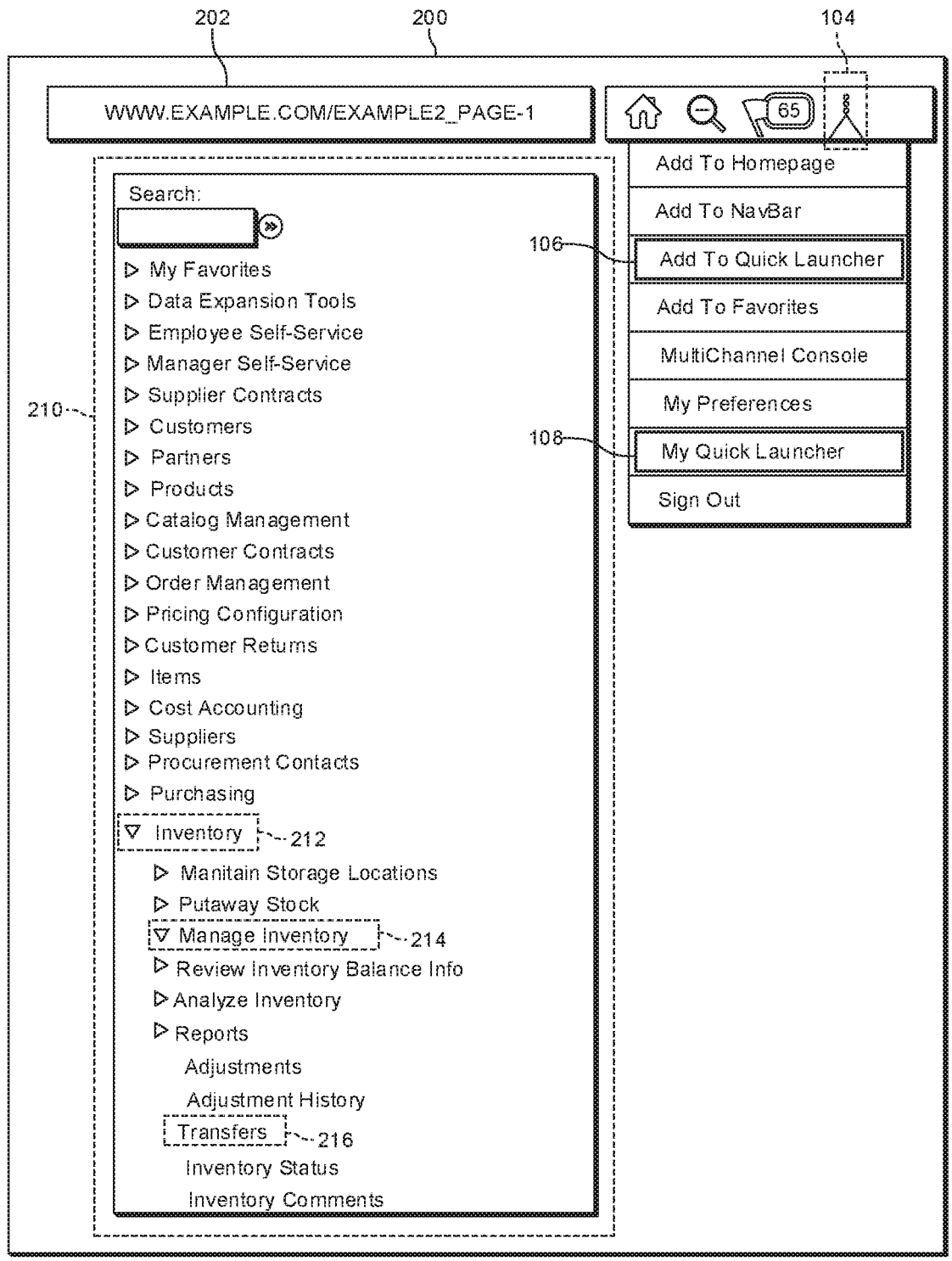
FIG. 6 illustrates a screenshot of a first stage of a stock transfer request transaction.
Figure 7:
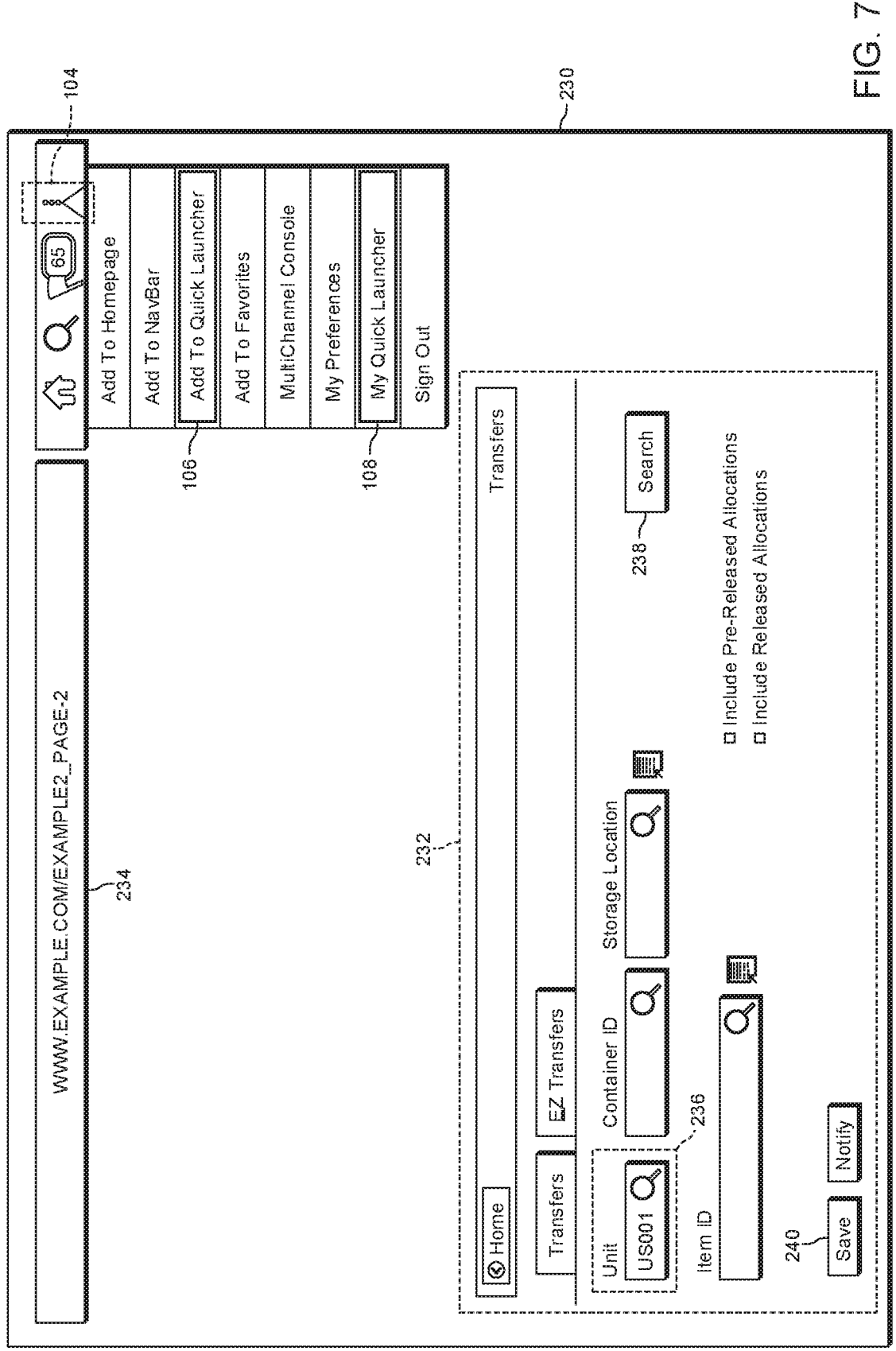
FIG. 7 illustrates a screenshot of a second stage of a stock transfer transaction.

FIGS. 6-7 illustrate an example of web pages depicting a series of stages for an item transfer transaction. Moreover, for purposes so simplicity of explanation, the same reference numbers are employed in FIGS. 1-7 to denote the same structure. Additionally, some reference numbers are not re-introduced in FIGS. 6-7.

FIG. 6 illustrates an example of a screenshot 200 that includes a web address 202 (e.g., a text box). The web address 202 includes a URL (e.g., a web address) of an external system, such as one of the external system 72 of FIG. 1. In the example illustrated in FIGS. 6-7, it is presumed that the external system is a supply chain management system.

The screenshot 200 includes a web page 210. The web page 210 represents a first stage of an item transfer transaction. The web page 210 includes a hierarchical list of user selectable text options. In the first stage of the transaction, a first selectable text option 212 labeled "INVENTORY" opens a second hierarchical level, and a second selectable text option 214 labeled "MANAGE INVENTORY" opens a third hierarchical level. Moreover, in the web page 210, the selectable text option 216 labeled "TRANSFERS" is selected. Upon selection of the selectable text option 216, the define item transaction advances to a second stage of the transfer item transaction.

FIG. 7 illustrates a screenshot 230 with a web page 232 depicting the second stage of the item transfer transaction. The screenshot 230 includes a web address 234 that is different from the web address 202 of FIG. 6. Additionally, the web page 232 includes a set of data fields with text boxes for user input (e.g., alpha numeric text). In the present example, the data field "UNIT" is populated with the text "US001", as indicated by the box 236. The web page 232 also includes a search button 238. The search button 238, if actuated, may populate additional data fields with data from the external system. Further, the web page 232 includes a save button 240. The save button, if actuated, completes the item transfer transaction.

FIGS. 8-13 illustrate an example of web pages depicting a series of stages for two different transactions, namely, a new stock request transaction and modification of a stock request transaction (e.g., modifying an existing stock request transaction). Moreover, for purposes so simplicity of explanation, the same reference numbers are employed in FIGS. 1-10 to denote the same structure. Additionally, some reference numbers are not re-introduced in FIGS. 8-10.

Figure 8:
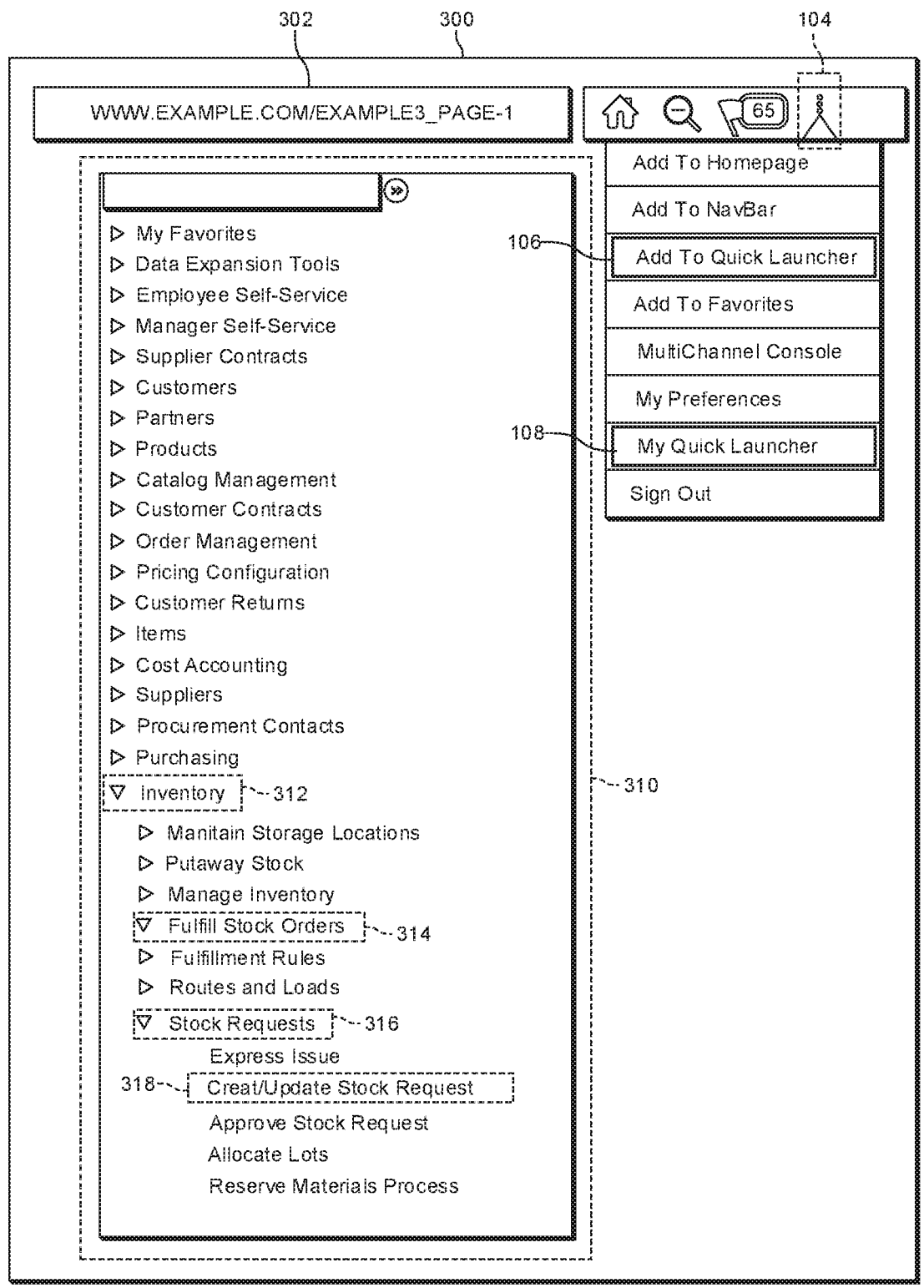
FIG. 8 illustrates a screenshot of a first stage of a new stock request transaction and a modification of a stock request transaction.

FIG. 8 illustrates an example of a screenshot 300 that includes a web address 302 (e.g., a text box). The web address 302 includes a URL (e.g., a web address) of an external system, such as one of the external systems 72 of FIG. 1. In the example illustrated in FIGS. 8-10, it is presumed that the external system is a supply chain management system.

The screenshot 200 includes a web page 310. The web page 310 represents a first stage of the new stock request transaction. The web page 310 includes a hierarchical list of user selectable text options. In the first stage of the transaction, a first selectable text option 312 labeled "INVENTORY" opens a second hierarchical level, and a second selectable text option 314 labeled "FULFILL STOCK ORDER" opens a third hierarchical level. Moreover, in the web page 310, the selectable text option 316 labeled "STOCK REQUESTS" is selected. Selection of the selectable text option 316, opens a fourth hierarchical level of a selectable text option 318 labeled "CREATE/UPDATE STOCK REQUEST" is selected. Selection of the selectable text option 318 advances both the new stock request transaction and the modifying the stock request transaction to a second stage.

Figure 9:
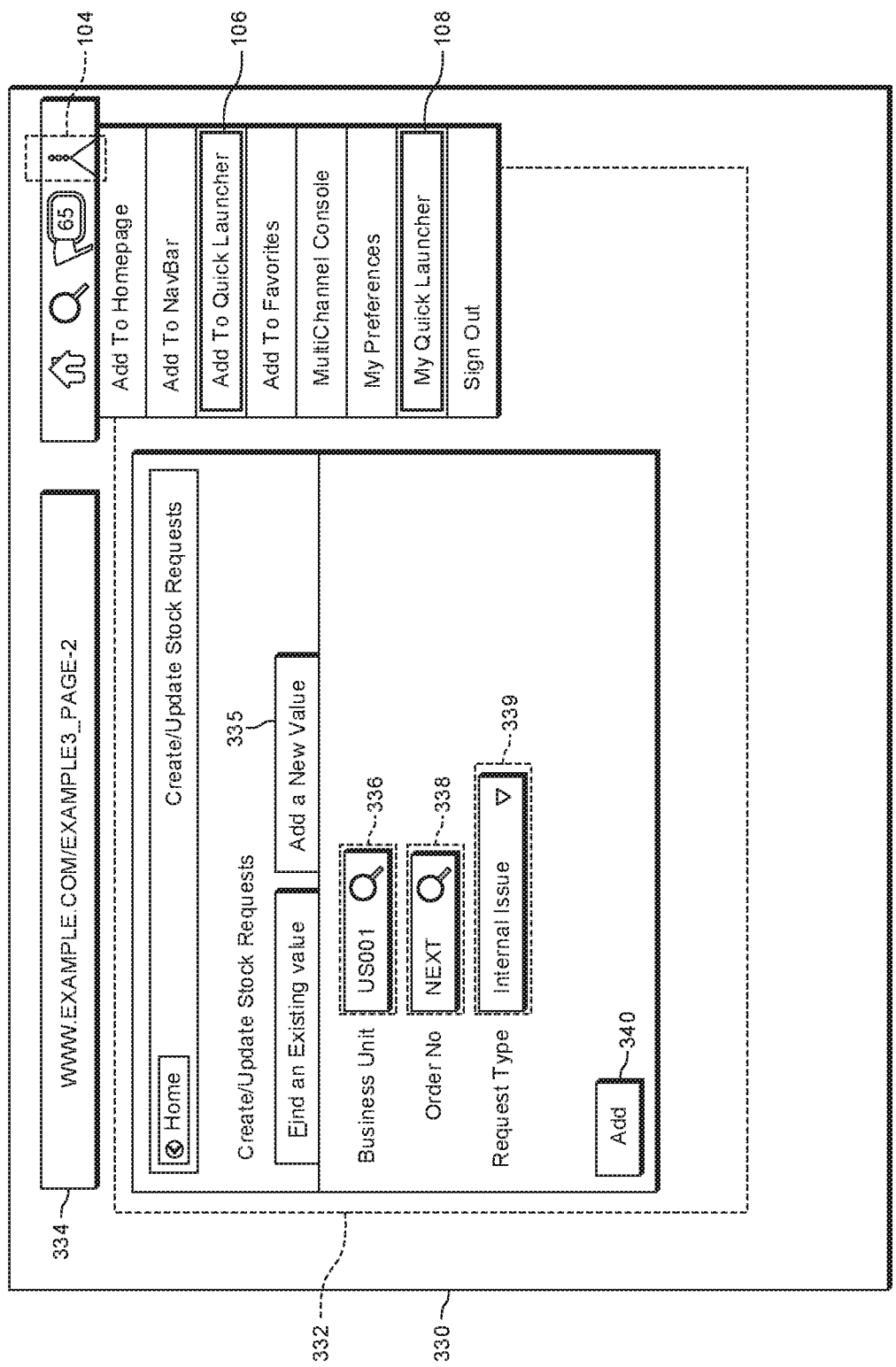
FIG. 9 illustrates a screenshot of a second stage of a new stock request transaction.

FIG. 9 illustrates a screenshot 330 with a web page 332 depicting the second stage of the new stock request transaction. The screenshot 330 includes a web address 334 (e.g., a text box) that is different from the web address 302 of FIG. 8. Additionally, the web page 332 includes a tab 335 labeled "ADD A NEW VALUE" that is selected. Selection of the tab 335 causes the web page 332 to provide a set of data fields with text boxes for user input (e.g., alpha numeric text) for adding the new stock request transaction. In the present example, the data field "BUSINESS UNIT" is populated with the text "US001", as indicated by the box 336. Furthermore, the data field "ORDER NO" is populated with the text "NEXT" as indicated by the box 338. Additionally the data field "REQUEST TYPE" (a drop-down menu) is populated with the selected option "INTERNAL ISSUE" as indicate by the box 339. The web page 332 also includes add button 340. The add button 340, if actuated, advances the new stock request transaction to a third stage.

Figure 10:
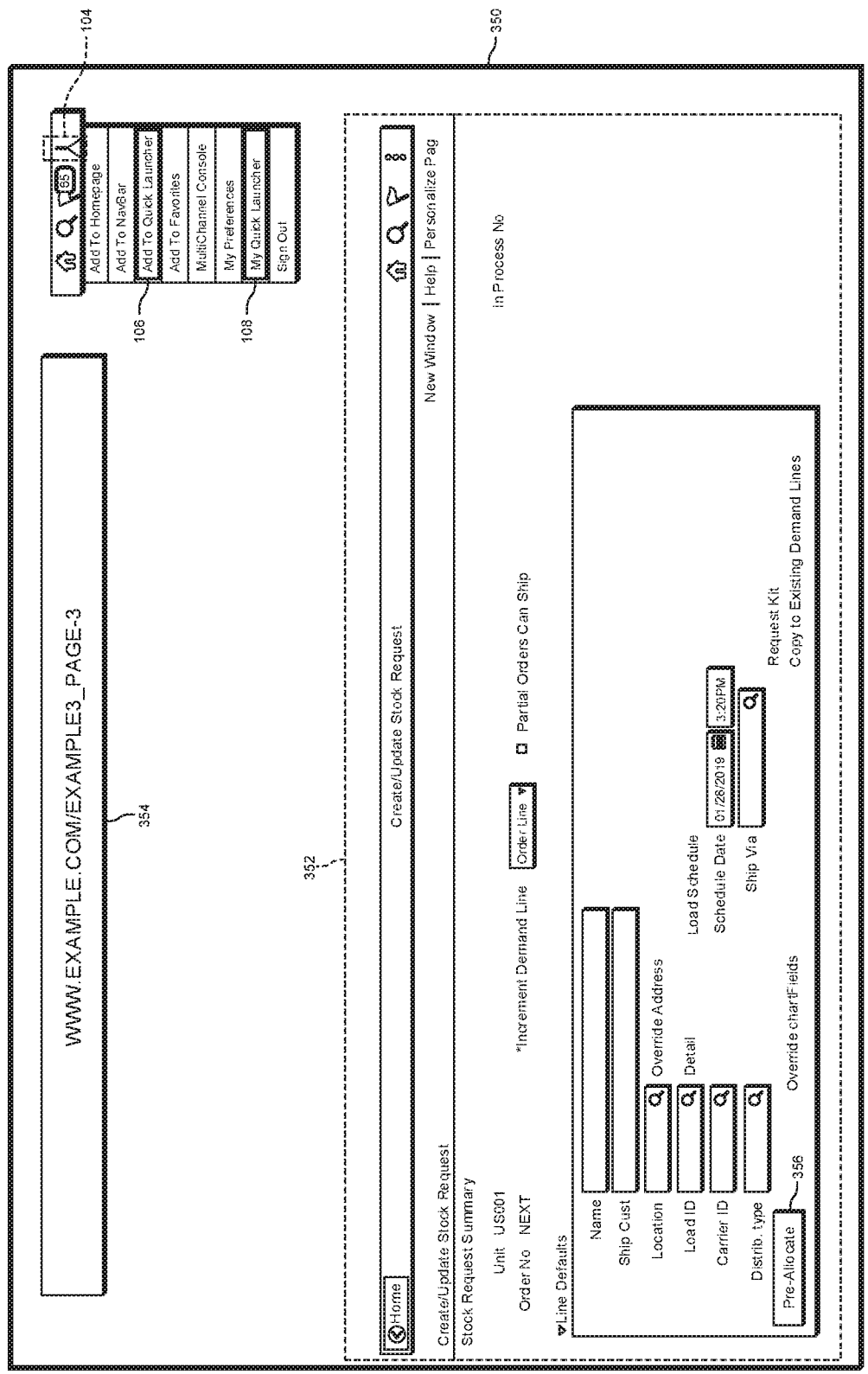
FIG. 10 illustrates a screenshot of a third stage of a new stock request transaction.

FIG. 10 illustrates a screenshot 350 with a web page 352 depicting the third stage of the new stock request transaction. The screenshot 350 includes a web address 354 (e.g., a text box) that is different from the web address 334 of FIGS. 9 and 302 of FIG. 8. Additionally, the web page 352 includes a set of data fields with text boxes for user input (e.g., alpha numeric text). In the present example, default data fields labeled "SCHEDULE DATE" are populated and the remaining data fields are blank. In this situation, the user input would be employed to populate the remaining data fields. The web page 352 includes a pre-allocate button 356 that, if actuated, completes the new stock request transaction.

Figure 11:
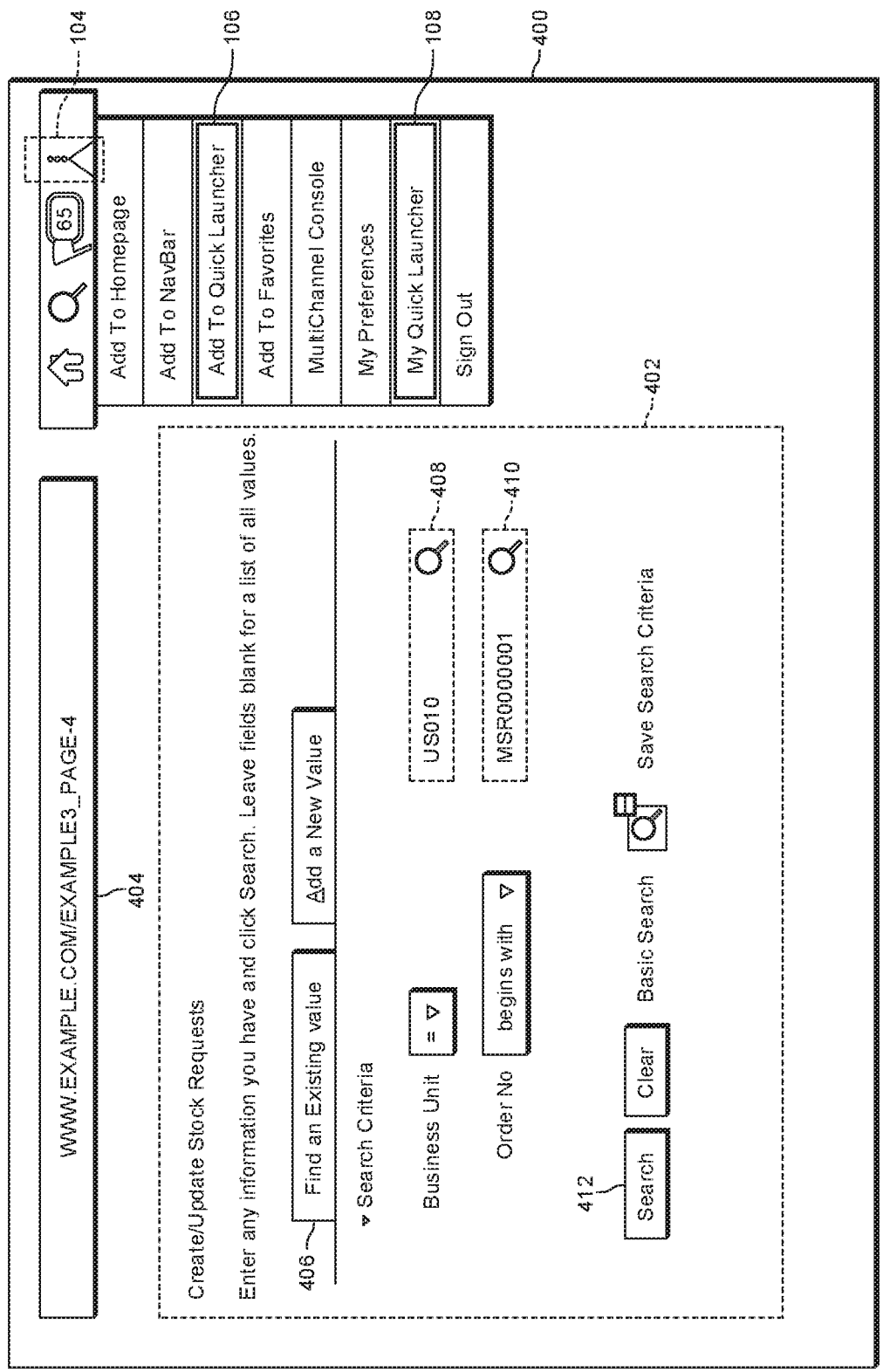
FIG. 11 illustrates a screenshot of a second stage of a modification of a stock request transaction.

FIG. 11 illustrates a screenshot 400 with a web page 402 depicting the second stage of the modification of the stock request transaction. The screenshot 400 includes a web address 404 that is different from the web address 302 of FIG. 8. Additionally, the web page 402 includes a tab 406 labeled "FIND AN EXISTING VALUE" that is selected. Selection of the tab 406 causes the web page 402 to provide a set of data fields with text boxes for user input (e.g., alpha numeric text) searching for an existing stock request transaction. In the present example, the data field "BUSINESS UNIT" is populated with the text "US010", as indicated by the box 408. Furthermore, the data field "ORDER NO" is populated with the text "MSR0000001" as indicated by the box 410. Additionally the data field "REQUEST TYPE" (a drop-down menu) is populated with the selected option "INTERNAL ISSUE". The web page 402 also includes a search button 412. The search button 412, if actuated, advances the modification of the stock request transaction to a third stage.

Figure 12:
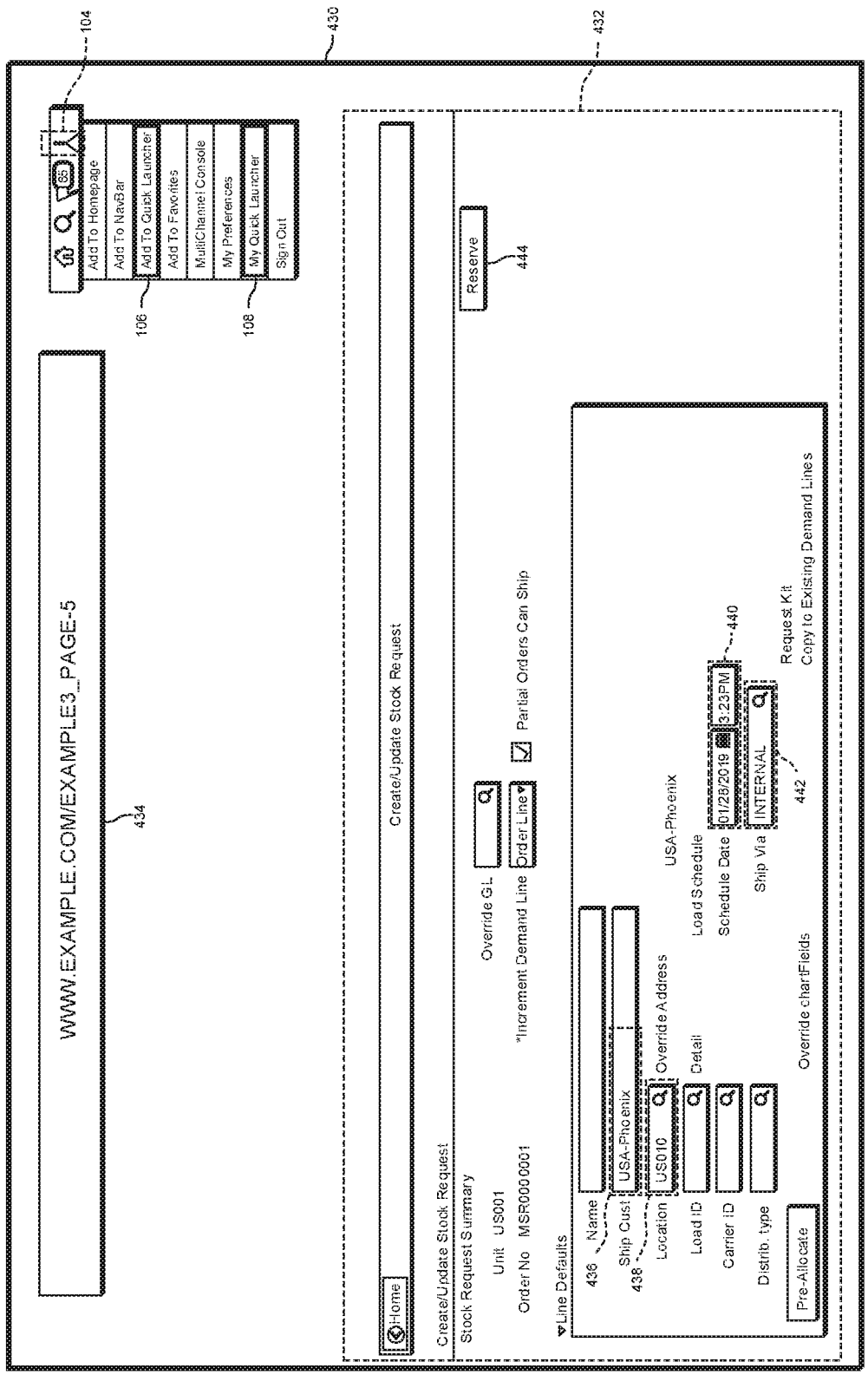
FIG. 12 illustrates a screenshot of a third stage of a modification of a stock request transaction.

FIG. 12 illustrates a screenshot 430 with a web page 432 depicting the third stage of the modification of the stock request transaction. The screenshot 430 includes a web address 434 (e.g., a text box) that is different from the web address 404 of FIGS. 11 and 302 of FIG. 8. Additionally, the web page 432 includes a set of data fields with text boxes for user input (e.g., alpha numeric text). In the present example, the data field "SHIP CUST" is populated with the text "USA-PHOENIX" as indicated by the box 436 and the data field "LOCATION" is populated with the text "US010", as indicated by the box 438. Further, the data field "SCHEDULE DATE" is populated with a date, as indicated by the box 440 and the data field "SHIP VIA" is populated with the text "INTERNAL", as indicated by the box 442. The web page 432 also includes a reserve button 444. The reserve button 444, if actuated, completes the modification of the stock request transaction.

Referring back to FIG. 1, throughout the series of stages of the transactions depicted in FIGS. 2-12, the first selectable element 106 labeled "Add to Quick Launcher" may be selected. Section of the first selectable element 106 launches the transaction state logger 80 of FIG. 1. In response to actuation of the transaction state logger 80, the quick launcher 74 (via the web browser 70) outputs a dialog box for adding an entry to the pending transaction log 82.

Additionally, as noted, in some examples, data fields available in particular screen shots of GUI instances (e.g., web pages) are dependent upon operations in other screenshots of GUI instances (e.g., web pages). For example, the data fields exposed by the web page 152 of FIG. 5 depicting the third stage of the define item transaction are dependent upon data sets entered and operations executed in the pages 110 of FIG. 1 and the web page 142 of FIG. 4. If different operations were executed in the web page 110 or the web page 142, a different web page would be output in place of the web page 152 of FIG. 5. Accordingly, multiple types of transactions can have a common web page. For instance, the transaction depicted by FIGS. 2-5 (the define item transaction) shares a common web page (with different operations executed) as the transfer item transaction depicted in FIG. 6. Similarly, the web pages illustrated in FIGS. 8-10 for the new stock request transaction share a common web page (e.g., the web page 310 of FIG. 8) with the modification of a stock request transaction depicted in FIGS. 8 and 11-13.

Figure 13:
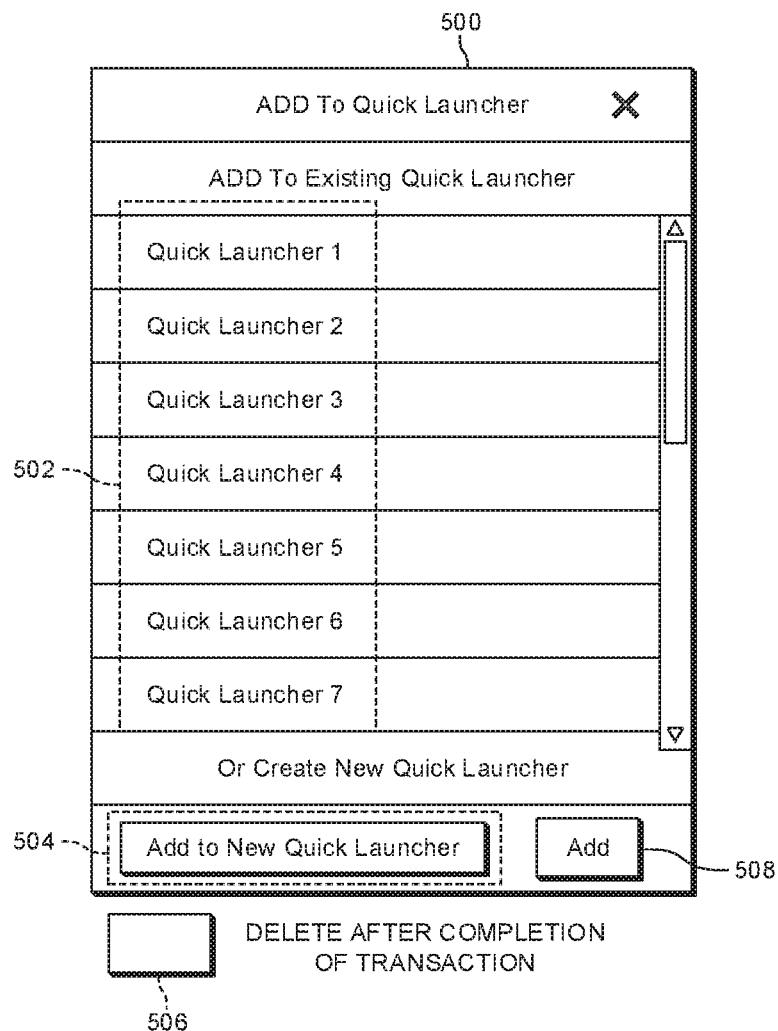
FIG. 13 illustrates a dialog box provided in response to launching a transaction state logger.

FIG. 13 illustrates an example of a dialog box 500 that could be output by the quick launcher 74 of FIG. 1 to generate and/or add an entry to the pending transaction log 82. In the present example, it is presumed that the first selectable element 106 was actuated while the screenshot 150 of FIG. 5 was output. The dialog box 500 includes a label "Add to Existing Quick Launcher" and a list of 7 already existing quick launcher transactions 502. In the present example, each of the existing quick launcher transactions 502 are selectable. Selecting one of the existing quick launcher transactions 502 allows the currently viewed stage of a transaction (e.g., the screenshot 150 of FIG. 5) to be added to a log entry corresponding to the selected existing quick launcher transaction 502.

Additionally, the dialog box 500 includes a description box 504 (e.g., a text box) that allows a character string for describing a type and/or a stage of the transaction. The dialog box 500 further includes a selectable option 508 (e.g., a checkbox) labeled "DELETE AFTER COMPLETION OF TRANSACTION". Selection of the selectable option 508 sets a flag indicating that the corresponding entry in the transaction log is to be deleted (or otherwise removed) from the transaction log after completion of the transaction.

Actuation of an add button 510 of the dialog box 500 causes the transaction state logger 80 of FIG. 1 to generate or update the entry for the pending transaction log 82. In the present example, if the first selectable element 106 was actuated while the screenshot 150 of FIG. 5 was output, the entry into the pending transaction log would also include a data set (user input) for the data fields "DESCRIPTION", "PHYSICAL NAME", "ITEM GROUP", "FAMILY" and "COST PROFILE GROUP" illustrated in FIG. 5.

Referring back to FIG. 1, to generate the entry for the pending transaction log 82, the transaction state logger 80 can generate a container for the pending transaction log 82. Moreover, the pending transaction log 82 can store the container with a user identifier (ID) of the user of the device 50, a container name and a transaction ID as a primary key for the pending transaction log 82. Further, as noted, in some situations, a delete after completion flag of the entry of the pending transaction log 82 is set (e.g., in response to selecting the selectable option 508 of FIG. 13). The entry for pending transaction log 82 stores transaction detailed information (e.g., a resource address and data in the data fields) in a data structure such as a Character Large Object (CLOB) column, a dynamic get value from in an standard format, such as the Extensible Markup Language (XML) format or the JSON format. The transaction state logger 80 provides the generated entry for the pending transaction log 82 to the user profile server 73, and in response the user profile server 73 stores the entry in the pending transaction log 82. In this manner, the pending transaction log 82 contains pending transaction data that is employable to restore the pending transaction to the same state that the pending transaction was in at the time the entry in the pending transaction log 82 was generated.

The transaction state logger 80 can generate multiple entries of the pending transaction log 82 for the same transaction. For example, as noted, FIGS. 3 and 4 both denote the second stage of the define item transaction with different data for data fields, such that FIGS. 3 and 4 denote different states of the define item transaction. In one example, the transaction state logger 80 could generate a first entry of the pending transaction log 82 based on FIG. 3 and a second entry of the pending transaction log 82 based on FIG. 4.

Additionally, the transaction state logger 80 can generate entries for different transactions for different external systems 72. For example, the transaction state logger 80 could generate a first entry of the pending transaction log 82 based on a first transaction in a first state with a first external system 72 and a second entry of the pending transaction log 82 based on a second transaction in a second state with a second external system 72.

Additionally, as noted, in some examples, the transaction state logger 80 can add a current transaction to an existing entry in the pending transaction log 82. In such a situation, a container for the pending transaction log 82 can be modified to store transaction detailed information (e.g., a resource address and data for the data fields) in a stored data structure. The transaction state logger 80 provides the modified entry for the pending transaction log 82 to the user profile server 73, and in response the user profile server 73 stores the updates in the pending transaction log 82. In this manner, the pending transaction log 82 contains pending transaction data that is employable to restore the pending transaction to the same state that the pending transaction was in at the time the entry in the pending transaction log 82 was updated.

At a subsequent time, actuation of the second selectable element 108 of FIG. 2-12 causes the transaction state retriever 86 to query the user profile server 73 for entries in the pending transaction log 82 associated with the user of the device 50. The user profile server 73 can return a list of entries associated with the user and the transaction state retriever 86 (via the web browser 70) outputs a pull down menu (or other selectable list) for selecting an entry to the pending transaction log 82.

Figure 14:
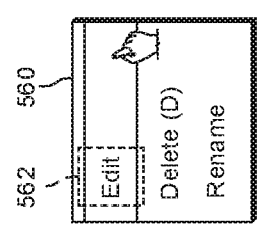
FIG. 14 illustrates a dialog box provided in response to launching a transaction state retriever.

FIG. 14 illustrates an example of a dialog box 550 that could be output by the transaction state retriever 86 of FIG. 1 to retrieve an entry from the pending transaction log 82 of FIG. 1. The dialog box 550 includes a list of selectable transactions, labeled "Quick Launcher 1" . . . "Quick Launcher 4". In practice, the phrase "Quick Launcher" may be replaced by a descriptive phrase.

The screenshot 550 also includes an options button 552 for each selectable transaction. Actuation of the options button 552 causes the transaction state retriever to provide options for editing and/or removing a corresponding selectable transaction. Furthermore, it is the presumed that the options button 552 corresponding to a first selectable transaction 554 has been selected by a user.

A second dialog box 560 is provided in response to the selection of the options button 552. The second dialog box 560 causes display of an option to edit, delete or rename a corresponding transaction. Moreover, selection of an edit option 562 causes the transaction state retriever to provide a dialog box 570.

The dialog box 570 allows granular editing of a particular transaction. More particularly, a first column 572 of the dialog box 570 causes display of a selectable element to delete a specific transaction in the selected transaction. Additionally, a second column 574 of the dialog box 570 causes display of text boxes for editing a description of a corresponding transaction in the selected transaction. Additionally, a third column 576 provide a text boxes for editing a resource address (e.g., a URL) for transaction of the selected transaction. In this manner, the dialog box 570 causes display of a user interface for designing and/or editing a transaction template that is selectable at a later time.

In response to selection of a particular pending transaction description ("Quick Launcher 1" illustrated in FIG. 14) the transaction stage retriever 86 causes the web browser 70 to load the resource address (e.g., URL) (or multiple resource addresses) of the pending transaction data in the selected transaction description to provide a web page with a transaction in a particular stage. Loading of the resource address causes a web server at the resource address to simulate execution of one or more operations for the transaction up to the particular stage. For example, a particular GUI instance corresponding to a web page represents a third GUI instance (e.g., a third stage) in the particular transaction, loading of the resource address causes the web server to respond in the same manner as if a first and a second GUI instance (e.g., first and second stages) of the particular transaction were executed. The transaction stage retriever 86 populates the web page with the data set stored in the pending transaction data of the selected entry of the pending transaction log 82. In this manner, the transaction is restored to the same state (the stage of the transaction with populated data fields) that the pending transaction was in at the time the entry in the pending transaction log 82 was generated. Accordingly, the user of the device 50 does not have to start a new instance of the transaction over, thereby obviating the need to re-enter data at particular stages of each transaction. Rather, the user of the device 50 can return to the state in the transaction where the transaction was previously left, such as in a previous session.

In some examples, upon completing a transaction that was stored in a particular state as an entry the pending transaction log 82, the entry corresponding to the transaction log 82 can be deleted. For instance, if the transaction was a retail transaction, it may be desirable to clear the transaction from the transaction log 82 after completion. Thus, if the delete after completion flag is set in the pending transaction data of a corresponding entry of the pending transaction log 82, the transaction state retriever 86 initiates removal of the entry from the pending transaction log 82 in response to detecting that the particular transaction has been completed. More specifically, the transaction state retriever 86 causes display of a request for removal of the entry from the pending transaction log 82 to the user profile server 73 in response to detecting that the particular transaction has been completed. In response, the user profile server 73 removes the entry from the pending transaction log 82.

Furthermore, as noted, FIGS. 2-5 describe stages of an add new stock transfer transaction. FIGS. 6-7 describe stages of an item transfer transaction, FIG. 8-10 describe stages of a new stock transfer transaction, and FIGS. 8 and 11-12 describe stages of a modification of a stock transaction. In each of these situations, inventory management employees may need to repeat some or all of these transactions at a particular state (a stage of a transaction with populated data fields) on a regular basis. The quick launcher 74 causes display of the user of the device 50 with the ability to store each such transaction and/or other transactions at particular states and recall the states of the transaction multiple times.

As an example, a user of an inventory management system may need to execute an item transfer transaction on a daily basis. In such a situation, the user of the device 50 could employ the transaction state logger 80 (by actuating the "Add to Quick Launcher") while viewing the web page 232 of FIG. 7, such that the pending transaction for the define item transaction is stored in the pending transaction log 82 at the state characterized in FIG. 7 (e.g., the second stage of the define item transaction with a data field populated). Thus, if the user desires to execute the define item transaction, the user can employ the transaction state retriever 86 to restore the define item transaction to the state characterized in FIG. 7, and this process can be repeated multiple times, even after completing each instance of the define item transaction.

Figure 15:
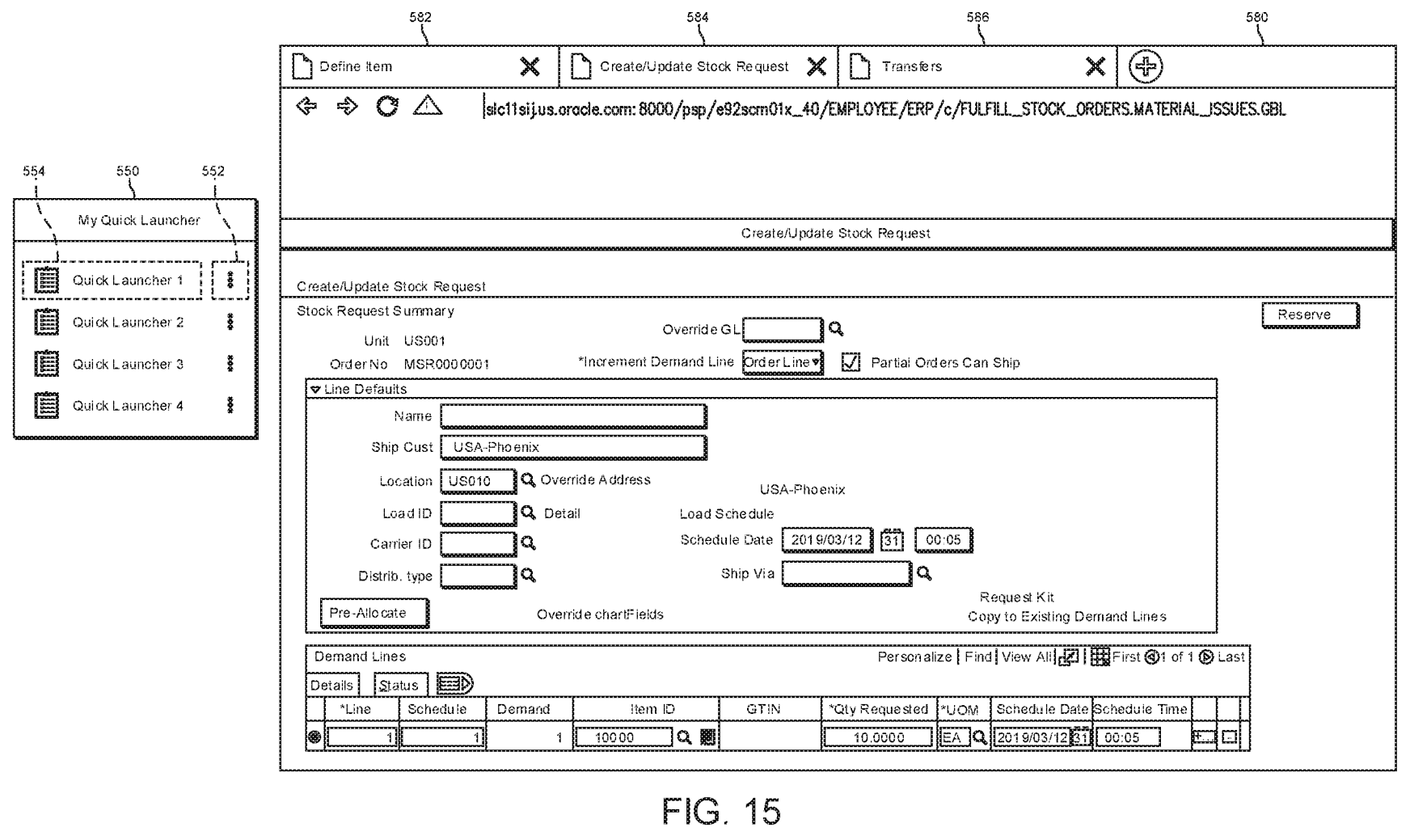

As an example of a situation where the same types of transactions are frequently executed, FIG. 15 illustrates the dialog box 550 of FIG. 14 wherein it is presumed that in response to selection of the first selectable transaction 554, 3 web pages are loaded in a web browser 580, and corresponding data fields are populated. In the present example, a first web page 582 labeled "Define Item" (corresponding to FIG. 5), a second web page 584 labeled "Create/Update Stock Request" (corresponding to FIG. 12) and a third web page 586 labeled "Transfers" (corresponding to FIG. 7) are each loaded and populated with data fields. In this manner, the user can execute any of the 3 transactions corresponding to the respective web pages with only selecting a single transaction (the first transaction 554). Accordingly, in an example work environment, a user could load (or set the web browser to automatically load) the first selectable transaction 554 daily (e.g., a beginning of a work shift) and each of the 3 web pages are loaded and populated so that the user can simply modify a subset of data fields during each transaction executed throughout the work shift.

Similarly, it may be desirable to load multiple uncompleted transactions into a log entry for single selectable transaction (e.g., the first selectable transaction 554) to allow the user to easily restore each uncompleted transaction without requiring the aforementioned re-entry of data. For instance, if the user is executing multiple transactions on different web sites to secure parts for a common project, the user may desire to complete each such transaction at the same time (or within the same working day). In such a situation, the user could add each uncompleted transaction to a log entry for the first selectable transaction 554 and later select the first selectable transaction 554 to complete each (previously) uncompleted transaction.

Figure 16:
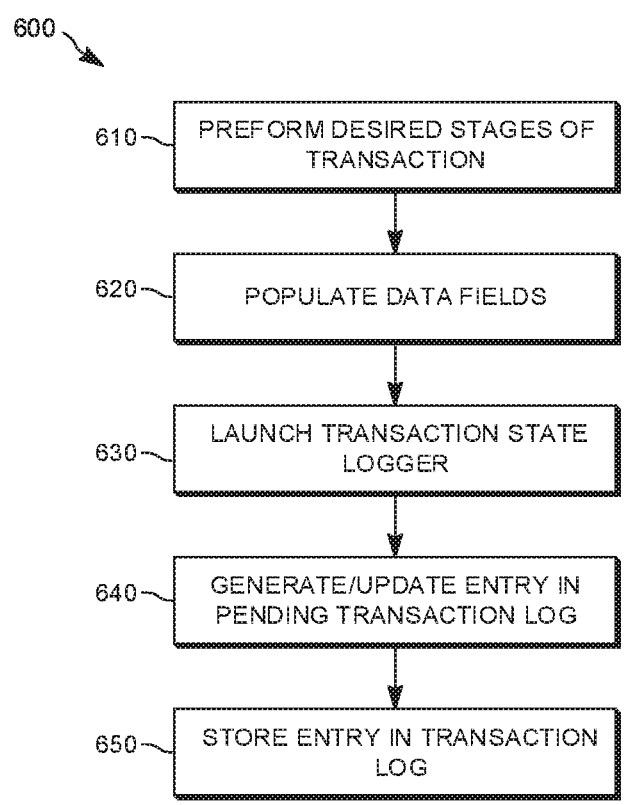
FIG. 16 illustrates a flowchart of an example method for logging a state of a transaction.
Figure 17:
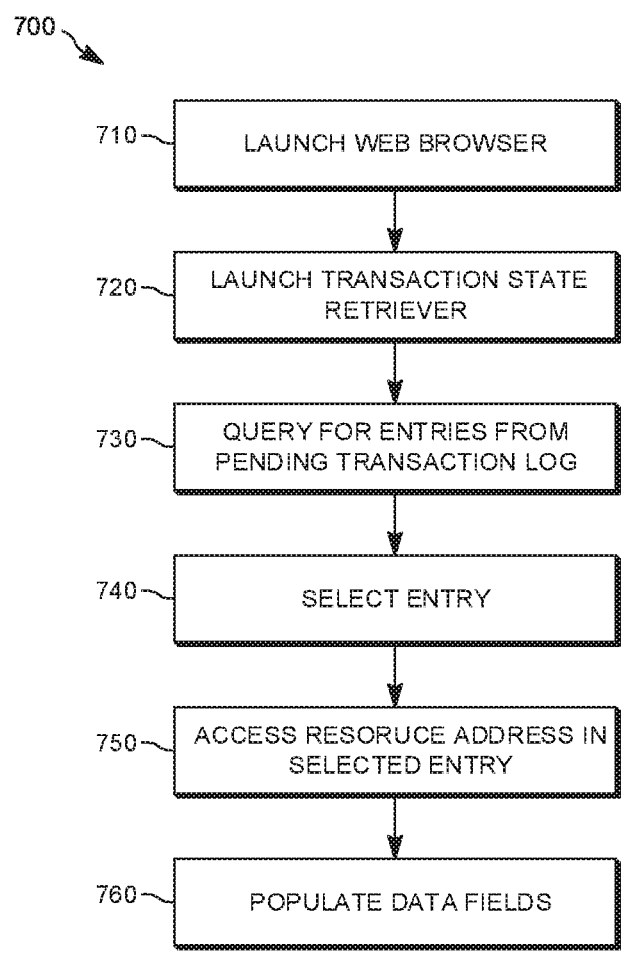
FIG. 17 illustrates a flowchart of an example method for retrieving and restoring a state of a transaction.

In view of the foregoing structural and functional features described above, an example method will be better appreciated with reference to FIGS. 16 and 17. While, for purposes of simplicity of explanation, the example methods of FIGS. 16 and 17 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 16 illustrates a flowchart of an example method 600 for logging a pending transaction in a particular state. The method 600 can be implemented, for example, by the device 50 of FIG. 1. At 610, a web browser (e.g., the web browser 70 of FIG. 1) is employed to by a user to perform a desired number of stages of a transaction. At 620, upon arriving at a desired stage, the data fields in the stage of the transaction (e.g., a web page) are populated with user input (e.g., alphanumeric text) to define a desired state of the transaction.

At 630, a transaction state logger (e.g., the transaction state logger 80 of FIG. 1) is launched for the desired state of the transaction to track the transaction. At 640, the transaction state logger 80 generates or updates an entry for a pending transaction log (e.g., the pending transaction log 82 of FIG. 1) with pending transaction data that is employable to restore the state of the transaction to the desired state. At 650 a server (e.g., the user profile server 73 of FIG. 1) stores the entry in the pending transaction log.

FIG. 17 illustrates a flowchart of an example method 700 for retrieving a pending transaction in a particular state. At 710, a web browser (e.g., the web browser 70) or other user interface is launched. At 720, a transaction state retriever (e.g., the transaction state retriever 86 of FIG. 1) is launched to retrieve at least a portion of a pending transaction log (e.g., the pending transaction log 82 of FIG. 1). At 730 the transaction state retriever queries a server (e.g., the user profile server 73) for a list of pending transactions stored in a transaction log, and the list of pending transactions (or some subset thereof) is output in a display (e.g., the output device 64 of FIG. 1).

At 740 a particular entry in the list of pending transactions is selected in response to user input. At 750, the transaction state retriever causes the web browser to access a resource address (e.g., a URL) stored in pending transaction data of the selected entry, causing an external system (e.g., an external system 72 of FIG. 1) to simulate execution of one or more operations for a transaction up to a particular stage of the transaction, which in turn causes the web browser to display a web page corresponding to a particular stage of a transaction. At 760, the transaction state retriever populates data fields of the stage of the transaction (displayed in the web browser) with the pending transaction data of the selected entry to restore the transaction to the same state that the transaction was in when the entry of the pending transaction log was generated. At this point, the user can employ the state of the transaction displayed in the web browser to complete the transaction.

Figure 18:
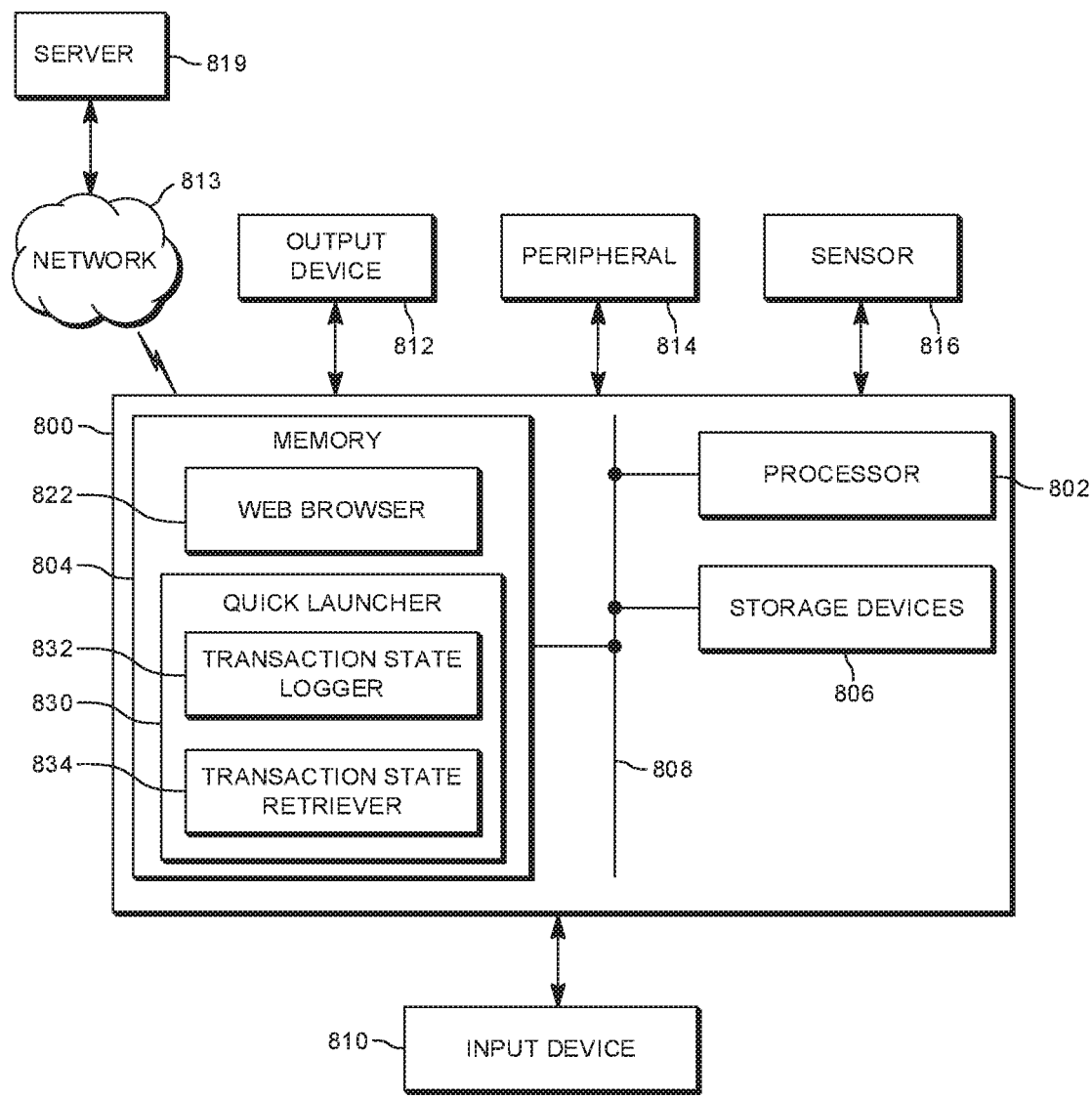
FIG. 18 illustrates an example of a computing system employable to store and retrieve transactions at particular states.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 18, the computing system 800 can include a computer processor 802, associated memory 804 (e.g., random access memory (RAM), cache memory, flash memory, etc.), one or more storage devices 806 (e.g., a solid state drive, a hard disk drive, an optical drive such as a compact disk (CD) drive or digital versatile disk (DVD) drive, a flash memory stick, etc.) and numerous other elements and functionalities. The computer processor 802 may be an integrated circuit for processing instructions. For example, the computer processor may be one or more cores, or micro-cores of a processor. Components of the computing system 800 can communicate over a data bus 808.

The computing system 800 may also include an input device 810, such as any combination of one or more of a touchscreen, keyboard, mouse, microphone, touchpad, electronic pen, or any other input device. Further, the computing system 800 can include an output device 812, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 812 can be the same physical device as the input device 810. In other examples, the output device 812 and the input device 810 can be implemented as separate physical devices. The computing system 800 can be connected to a network 813 (e.g., a local area network (LAN), a wide area network (WAN)

such as the Internet, mobile network, or any other type of network) via a network interface connection (not shown). The input device 810 and output device(s) 812 can be connected locally and/or remotely (e.g., via the network 813) to the computer processor 802, the memory 804 and/or the storage device 806. Many different types of computing systems exist, and the aforementioned input device 810 and the output device 812 can take other forms. The computing system 800 can further include a peripheral 814 and a sensor 816 for interacting with the environment of the computing system 800 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 800 can communicate with a server 819 via the network 813.

The memory 804 can include web browser 822 (or other user interface) that can be employed to access external systems and execute transactions. The memory 804 can also include a quick launcher 830. The quick launcher 830 includes a transaction state logger 832 that can generate an entry for a pending transaction log to store pending transaction data employable for restoring a transaction to a particular state (e.g., a particular stage of the transaction populated with associated data for data fields). The quick launcher 830 can further include a transaction state retriever 834 that can retrieve list of entries from the server 819 in the pending transaction log and allow selection of a given pending transaction. Selection of an entry in the list of entries in the pending transaction log causes the transaction state retriever to load a corresponding pending transaction at a state corresponding to the selected entry of the pending transaction log.

Further, one or more elements of the aforementioned computing system 800 can be located at a remote location and connected to the other elements over a network 813. Further, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:

causing display of a given graphical user interface (GUI) instance, on a given web page instance, of a set of GUI instances for a given transaction with an external system, the given GUI instance of the given transaction comprises a set of data fields for completing the given transaction, wherein the set of data fields exposed in the given GUI instance are dependent on execution of an operation in another GUI instance in the set of GUI instances for the given transaction, wherein the given GUI instance of the transaction receives a given data set for the set of data fields, wherein the given data set characterizes user input for the given GUI instance of the given transaction, and the given data set and the given GUI instance of the given transaction correspond to a given state of the given transaction, wherein the set of GUI instances for the given transaction represents a sequence to complete the given transaction, such that each GUI instance represents a stage of the sequence and the given GUI instance corresponds to a given stage of the given transaction;

tracking, by a transaction state logger, the given transaction in response to actuation of a given selectable element during the given GUI instance of a given transaction, wherein the transaction state logger generates or updates a given entry for a pending transaction log that stores a given resource address of the given GUI instance of the given transaction and the given data set for the set of data fields, wherein another entry stores another resource address and another data set of data fields for another stage of the given transaction;

retrieving, by a transaction state retriever, at least a portion of the pending transaction log in response to actuation of another selectable element, the transaction state retriever causes display of a list of entries in the pending transaction log, and wherein selection of a particular entry in the list of entries in the pending transaction log causes the transaction state retriever to load a particular resource address stored with the particular entry a to cause a web server to simulate execution of an operation for a selected pending transaction to load the selected pending transaction in a state corresponding to the data in the particular entry of the pending transaction log, such that loading of the selected pending transaction causes the web server to respond as if at least a first stage of the selected transaction was executed prior to a particular stage corresponding to the particular entry; and restoring, by the transaction state receiver, a particular GUI instance of the given transaction to the given a particular state, on another web page instance by employing the data in the particular entry of the pending transaction to populate the particular GUI instance, such that the stage of the sequence of the given transaction is restored to the particular stage of the sequence corresponding to the particular GUI instance, wherein the particular stage of the sequence corresponding to the given GUI instance is subsequent to the first stage and prior to completion of the given transaction.

2. The method of claim 1, wherein the loading further comprises:

accessing the given resource address stored in the given entry of the pending transaction log to provide the given GUI instance from a set of GUI instances of the selected pending transaction; and populating a set of data fields in the given GUI instance in the set of GUI instances of the selected pending transaction with data stored in the given entry, wherein the set of data fields in the given GUI instance are dependent upon execution of an operation in another GUI instance in the selected pending transaction.

3. The method of claim 1, wherein the external system comprises a database management system.

4. The method of claim 1, wherein the particular resource address of the particular GUI instance of the selected pending transaction of the particular entry of the pending transaction log is a uniform resource locator (URL).

5. The method of claim 1, wherein the given GUI instance of the given transaction causes display of a third selectable element for completing the given transaction.

6. The method of claim 1, wherein the pending transaction log comprises:
   a first entry for a first pending transaction in a first state; and
   a second entry for a second pending transaction in a second state.

7. The method of claim 6, wherein the first pending transaction is executable on the first external system and the second pending transaction is executable on the second external system.

8. The method of claim 1, wherein the transaction state retriever queries a server for the list of entries in the pending transaction log that are associated with a given user.

9. The method of claim 1, wherein the transaction state logger and the transaction state retriever are components of a quick launcher and the quick launcher is installed as a plugin of the web-browser.

10. The method of claim 9, wherein the quick launcher causes display of a user interface for designing and editing a transaction template.

11. The method of claim 1, wherein the transaction state retriever initiates removal of the particular entry from the pending transaction log in response to completion of the selected pending transaction.

12. The method of claim 1, wherein the loading further comprises:
   accessing a plurality of resource addresses stored in the given entry of the pending transaction log to provide multiple GUI instances for multiple transactions in response to selection of the given entry; and
   populating each of the multiple GUI instances of the multiple transactions corresponding to the plurality of resource addresses in the given entry of the pending transaction log with a set of data fields stored in the given entry of the pending transaction log, wherein the set of data fields in each of the multiple GUI instances are dependent upon execution of an operation in another GUI instance in each respective transaction of the multiple transactions.

13. The method of claim 1, the method further comprising:
   completing the given transaction in response to completion of the given GUI instance and one or more GUI instances in the set of GUI instances;
   retrieving, by the transaction state retriever, a portion of the pending transaction log in response to actuation of the another selectable element, wherein the given entry of the pending transaction log is selected; and
   generating, by the transaction state receiver, another transaction at the given stage of the sequence corresponding to the given GUI instance in response to selection of the given entry, wherein the another transaction is generated at the given stage corresponding to the given GUI instance without re-executing GUI instances of the set of GUI instances prior to the given GUI instance in the sequence.

14. The method of claim 13, wherein the another transaction is generated at the given stage of the sequence corresponding to the given GUI instance by employing the another data set stored in the another entry.

15. A method for logging a state of a given transaction, the method comprising:
   receiving, by a computing platform, a given data set for the set of data fields, wherein the given data set characterizes user input for a given graphical user interface (GUI) instance, on a given web page instance, of a set of GUI instances for the given transaction, wherein the set of data fields exposed in the given GUI instance are dependent on execution of an operation in another GUI instance in the set of GUI instances for the given transaction and the given data set and the given GUI instance of the given transaction correspond to a given state of the given transaction, wherein the set of GUI instances for the given transaction represents a sequence to complete the given transaction, such that each GUI instance represents a stage of the sequence and the given GUI instance corresponds to a given stage of the given transaction;
   generating or updating, by the computing platform, in response to actuation of a given selectable element, a given entry for a pending transaction log entry that characterizes a given resource address of the given GUI instance of the given transaction and data characterizing the given data set for the set of data fields, wherein another entry stores another resource address and another set of data fields for another stage of the given transaction;
   whereby selection of a particular entry of the pending transaction log causes the computing platform to load a particular state of the given transaction, wherein the loading comprises:
      accessing a particular resource address stored in the particular entry of the pending transaction log to to load the particular resource address stored with the particular entry to cause a web server to simulate execution of an operation for the given transaction to provide a particular GUI instance of the given transaction to another web page instance, such that loading of the particular state of the given transaction causes the web server to respond as if at least a first stage of the given transaction was executed prior to the particular stage corresponding to the particular entry; and
      populating the particular GUI instance of the given transaction with the sets of data fields stored in the particular entry of the pending transaction log, such that the stage of the sequence of the given transaction is restored to the particular stage of the sequence corresponding to the given particular GUI instance, wherein the given particular stage of the sequence corresponding to the particular GUI instance is subsequent to the first stage and prior to completion of the transaction.

16. The method of claim 15, wherein the user interface is a user interface of a database management system.

17. The method of claim 15, wherein the resource address of the given particular state is a uniform resource locator (URL) address.

18. The method of claim 15, wherein the given particular GUI instance of the given transaction causes display of a third selectable element for completing the given transaction.

19. A non-transitory computer-readable storage medium storing program instructions that when executed by a computing platform operating on a device cause the computing platform to perform operations comprising:

receiving, by a computing platform, a given data set for a set of data fields, wherein the given data set characterizes user input for a given graphical user interface (GUI) instance, on a given web page instance, in a set of GUI instances for a given transaction, wherein the set of data fields exposed in the given GUI instance are dependent on execution of an operation in another GUI instance in the set of GUI instances for the given transaction, and the set of data fields and the given GUI instance of the given transaction correspond to a given state of the given transaction, wherein the set of GUI instances for the given transaction represents a sequence to complete the given transaction, such that each GUI instance represents a stage of the sequence and the given GUI instance corresponds to a given stage of the given transaction;

generating or updating, by the computing platform, in response to actuation of a given selectable element, a given entry for a pending transaction log entry that characterizes a given resource address of the given GUI instance of the given transaction and data characterizing the given data set for the set of data fields, wherein another entry stores another resource address and another set of data fields for another stage of the given transaction;

whereby selection of a particular entry of the pending transaction log causes the computing platform to load a particular state of the given transaction, wherein the loading comprises:

accessing a particular resource address stored in the particular entry of the pending transaction log to load the particular resource address of the particular entry to cause a web server to simulate execution of an operation for the given transaction to provide a particular GUI instance of the given transaction to another web page instance, such that loading of the selected particular entry causes the web server to respond as if at least a first stage of the given transaction was executed prior to the particular stage corresponding to the particular entry; and populating the GUI instance of the transaction with the sets of data fields stored in the particular entry of the pending transaction log, such that the stage of the sequence of the given transaction is restored to a particular stage of the sequence corresponding to the particular GUI instance, wherein the stage of the sequence corresponding to the given particular GUI instance is subsequent to the first stage and prior to completion of the given transaction.

20. The medium of claim 19, wherein the user interface is a user interface of a database management system.

21. The medium of claim 19, wherein the particular resource address of the particular state of the given transaction is a uniform resource locator (URL) address, and wherein the particular GUI instance of the user interface is a web page located at the URL address.

22. The medium of claim 19, wherein the particular GUI instance of the given transaction causes display of a third selectable element for completing the given transaction.

* * * * *

UNITED STATES PATENT AND TRADEMARK OFFICE
CERTIFICATE OF CORRECTION

| | | |
|---|---|---|
| PATENT NO. | : 11,216,285 B2 | |
| APPLICATION NO. | : 16/441380 | |
| DATED | : January 4, 2022 | |
| INVENTOR(S) | : Cheng et al. | |

It is certified that error appears in the above-identified patent and that said Letters Patent is hereby corrected as shown below:

In the Drawings

On sheet 17 of 18, in FIG. 17, under Reference Numeral 750, Line 1, delete "RESORUCE" and insert -- RESOURCE --, therefor.

In the Specification

In Column 9, Line 29, delete "FIGS." and insert -- FIG. --, therefor.

In Column 10, Line 62, delete "FIGS." and insert -- FIG. --, therefor.

In Column 11, Line 28, delete "FIGS." and insert -- FIG. --, therefor.

In Column 13, Line 25, delete "FIG." and insert -- FIGS. --, therefor.

In Column 14, Line 46, delete "FIG." and insert -- FIGS. --, therefor.

In the Claims

In Column 18, Line 42, in Claim 1, delete "a to" and insert -- to --, therefor.

In Column 18, Line 52, in Claim 1, after "to" delete "the given".

In Column 20, Line 42, in Claim 15, after "log" delete "to".

In Column 20, Line 58, in Claim 15, after "the" delete "given".

In Column 20, Line 59, in Claim 15, after "the" delete "given".

In Column 20, Line 66, in Claim 17, after "the" delete "given".

Signed and Sealed this
Seventh Day of June, 2022

Katherine Kelly Vidal
*Director of the United States Patent and Trademark Office*

In Column 21, Line 1, in Claim 18, after "the" delete "given".

In Column 22, Line 21, in Claim 19, after "the" delete "given".